(12) United States Patent
Ayrapetyan et al.

(10) Patent No.: US 11,507,521 B2
(45) Date of Patent: Nov. 22, 2022

(54) APPARATUS AND METHOD FOR CONTROLLING USE OF BOUNDED POINTERS

(71) Applicant: Arm Limited, Cambridge (GB)

(72) Inventors: Ruben Borisovich Ayrapetyan, Cambridge (GB); Kevin Brodsky, Cambridge (GB); Branislav Rankov, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/260,758

(22) PCT Filed: Jul. 5, 2019

(86) PCT No.: PCT/GB2019/051906
§ 371 (c)(1),
(2) Date: Jan. 15, 2021

(87) PCT Pub. No.: WO2020/039161
PCT Pub. Date: Feb. 27, 2020

(65) Prior Publication Data
US 2021/0294755 A1 Sep. 23, 2021

(30) Foreign Application Priority Data

Aug. 20, 2018 (GB) ..................... 1813520

(51) Int. Cl.
  *G06F 12/14* (2006.01)
  *G06F 12/02* (2006.01)
(52) U.S. Cl.
  CPC ........ *G06F 12/1441* (2013.01); *G06F 12/023* (2013.01); *G06F 2212/1044* (2013.01)
(58) Field of Classification Search
  None
  See application file for complete search history.

(56) References Cited

U.S. PATENT DOCUMENTS 5,845,331 A 12/1998 Carter et al.
2008/0126736 A1 5/2008 Heil
(Continued)

FOREIGN PATENT DOCUMENTS

WO 2016/060817 4/2016

OTHER PUBLICATIONS

International Search Report and Written Opinion of the ISA for PCT/GB2019/051906, dated Sep. 23, 2019, 13 pages.
(Continued)

*Primary Examiner* — Charles Rones
*Assistant Examiner* — Ryan Dare
(74) *Attorney, Agent, or Firm* — Nixon & Vanderhye P.C.

(57) ABSTRACT

Memory allocation circuitry allocate a memory region in memory, and bounded pointer generation circuitry generates bounded pointers including a revocable bounded pointer that provides a pointer value and range information identifying an address range of the memory region. The memory allocation circuitry provides, at a header location in the memory, a header for the memory region with a first token field which is initialized to a first token value associated with the memory region. The memory allocation circuitry is responsive to the deallocation of the memory region to modify the stored value in the first token field of the header. In response to a request to generate a memory address using the revocable bounded pointer, a use authentication check prevents generation of the memory address when it is determined that the stored value in the first token field has been changed.

26 Claims, 13 Drawing Sheets

(56) References Cited

U.S. PATENT DOCUMENTS

2016/0371496 A1 12/2016 Sell
2019/0289059 A1* 9/2019 Vanahalli ................ H04L 67/06

OTHER PUBLICATIONS

Combined Search and Examination Report for GB1813520.2, dated Feb. 27, 2019, 5 pages.

* cited by examiner

A)  SET   PR1 = 140000  ⟶ trigger error

B)  SET   PR1 = 140000

LD   R5,  PR1  ⟶ trigger error

APPARATUS AND METHOD FOR CONTROLLING USE OF BOUNDED POINTERS This application is the U.S. national phase of International Application No. PCT/GB2019/051906 filed 5 Jul. 2019, which designated the U.S. and claims priority to GB Patent Application No. 1813520.2 filed 20 Aug. 2018, the entire contents of each of which are hereby incorporated by reference.

The present technique relates to the field of data processing.

Some data processing apparatuses may support bounded pointers where a pointer indicating a particular address is associated with range information indicating an allowable range of addresses for the pointer. For example, such pointers may be referred to as "fat pointers".

In addition to range information, such bounded pointers may also have other associated attributes, defining one or more restrictions/permissions on the use of the pointer. Use of such bounded pointers can hence provide strong security, by placing constraints on how the pointer value specified by the bounded pointer is used.

When a memory region is allocated in memory, for example to enable that memory region to be used by a particular process, one or more bounded pointers can be established for use in association with the allocated memory area. Such a bounded pointer may include range information identifying the address range of the allocated memory region. When a process seeks to generate a memory address using the bounded pointer, it will be constrained to only generate memory addresses that fall within the address range of the allocated memory region.

A problem that may arise is that when the memory region is later deallocated, freeing up that memory space for reallocation, the bounded pointer may still be available to processing circuitry. The potential use of such a bounded pointer after the associated memory region has been deallocated is referred to as a "use-after-free" problem. In particular, use of a bounded pointer after the associated memory region has been deallocated can give rise to undefined behaviour of software if that use occurs due to programming error. Additionally, when such use of a bounded pointer occurs as an action intentionally caused by a security attacker, this can potentially lead to a security leak of information, and/or remote code execution.

Accordingly, it would be desirable to provide a technique which alleviated the use-after-free problem.

In one example configuration, there is provided an apparatus comprising: memory allocation circuitry to allocate a memory region in memory; and bounded pointer generation circuitry to generate bounded pointers comprising at least a revocable bounded pointer for use in accessing the memory region, the revocable bounded pointer providing a pointer value and range information identifying an address range of the memory region; wherein the memory allocation circuitry is arranged to provide, at a header location in the memory, a header for the memory region, the header having a first token field whose stored value is initialised to a first token value associated with the memory region, the header location being derivable from the range information provided by the revocable bounded pointer, and wherein the memory allocation circuitry is responsive to a subsequent deallocation of the memory region to modify the stored value in the first token field of the header; and whereby in response to a request to generate a memory address using the revocable bounded pointer, a use authentication check is arranged to prevent generation of the memory address when it is determined that the stored value in the first token field has been changed.

In a further example configuration, there is provided a method of controlling use of bounded pointers in an apparatus having memory allocation circuitry to allocate a memory region in memory, and bounded pointer generation circuitry to generate bounded pointers, the method comprising: arranging the bounded pointer generation circuitry to generate at least a revocable bounded pointer for use in accessing the memory region, the revocable bounded pointer providing a pointer value and range information identifying an address range of the memory region; providing, at a header location in the memory, a header for the memory region, the header having a first token field whose stored value is initialised to a first token value associated with the memory region, the header location being derivable from the range information provided by the revocable bounded pointer; causing the memory allocation circuitry to be responsive to a subsequent deallocation of the memory region to modify the stored value in the first token field of the header; and in response to a request to generate a memory address using the revocable bounded pointer, causing a use authentication check to prevent generation of the memory address when it is determined that the stored value in the first token field has been changed.

In a yet further example configuration, there is provided an apparatus comprising: memory allocation means for allocating a memory region in memory; and bounded pointer generation means for generating bounded pointers comprising at least a revocable bounded pointer for use in accessing the memory region, the revocable bounded pointer providing a pointer value and range information identifying an address range of the memory region; wherein the memory allocation means is arranged to provide, at a header location in the memory, a header for the memory region, the header having a first token field whose stored value is initialised to a first token value associated with the memory region, the header location being derivable from the range information provided by the revocable bounded pointer, and wherein the memory allocation means is responsive to a subsequent deallocation of the memory region to modify the stored value in the first token field of the header; and whereby in response to a request to generate a memory address using the revocable bounded pointer, a use authentication check is arranged to prevent generation of the memory address when it is determined that the stored value in the first token field has been changed.

The present technique will be described further, by way of illustration only, with reference to examples thereof as illustrated in the accompanying drawings, in which.

Figure 7A:
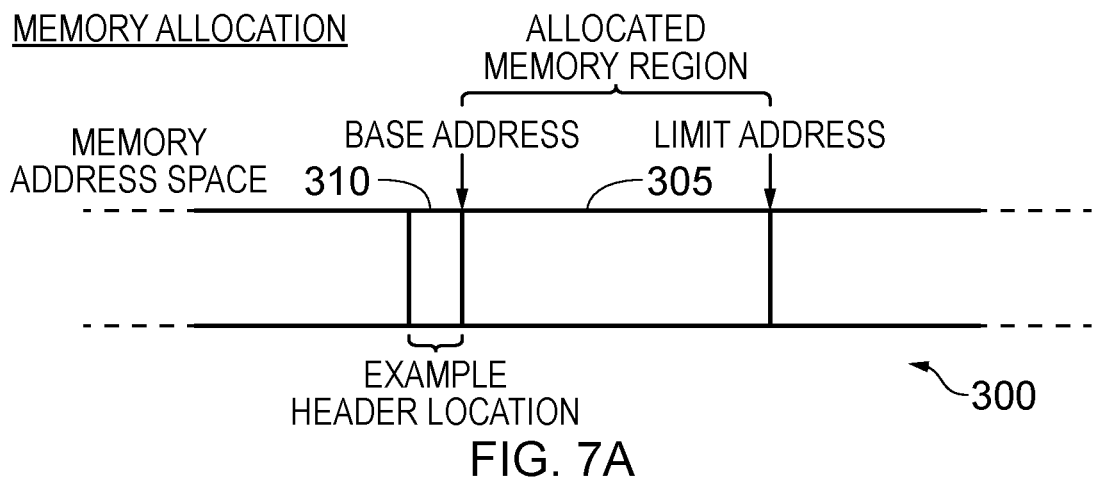
Figure 7B:
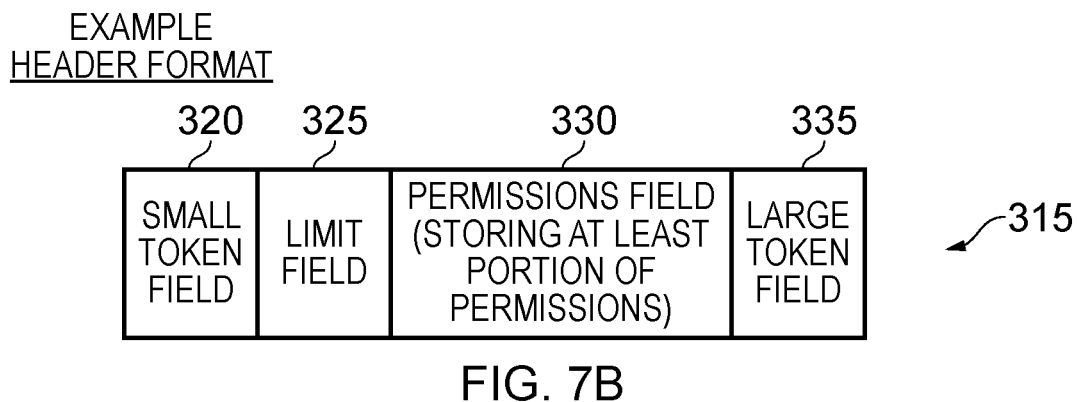
Figure 7C:
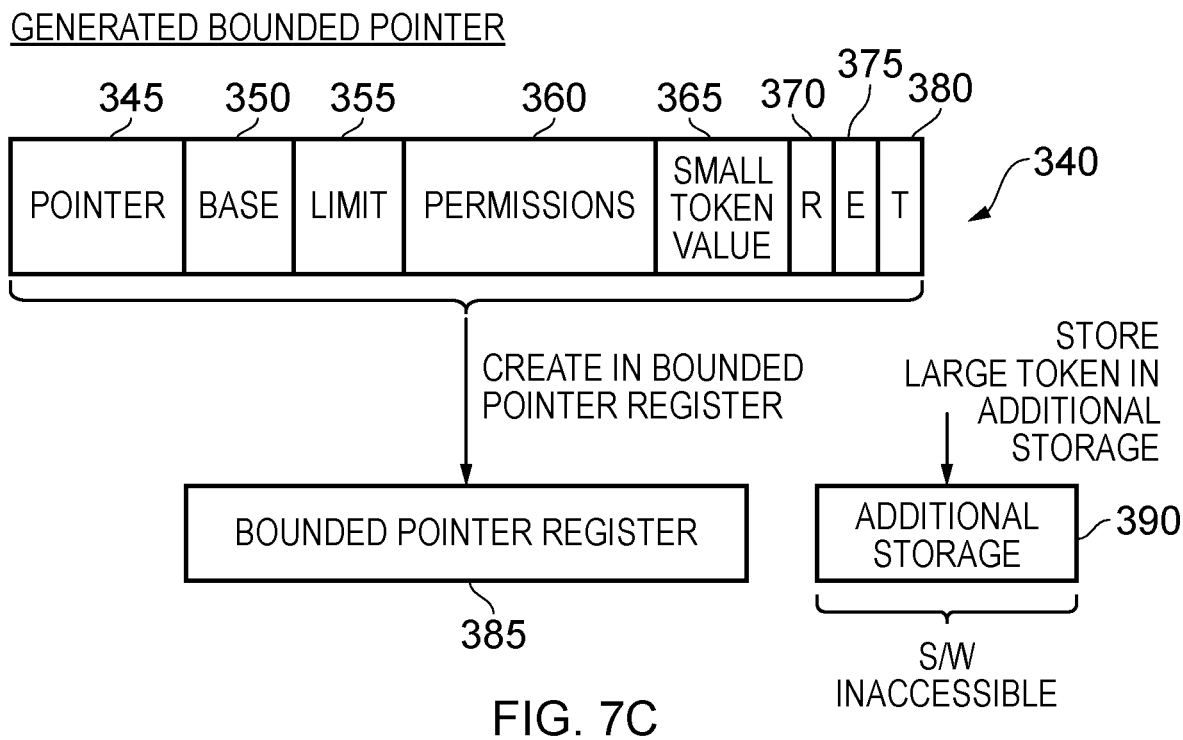
Figure 8:
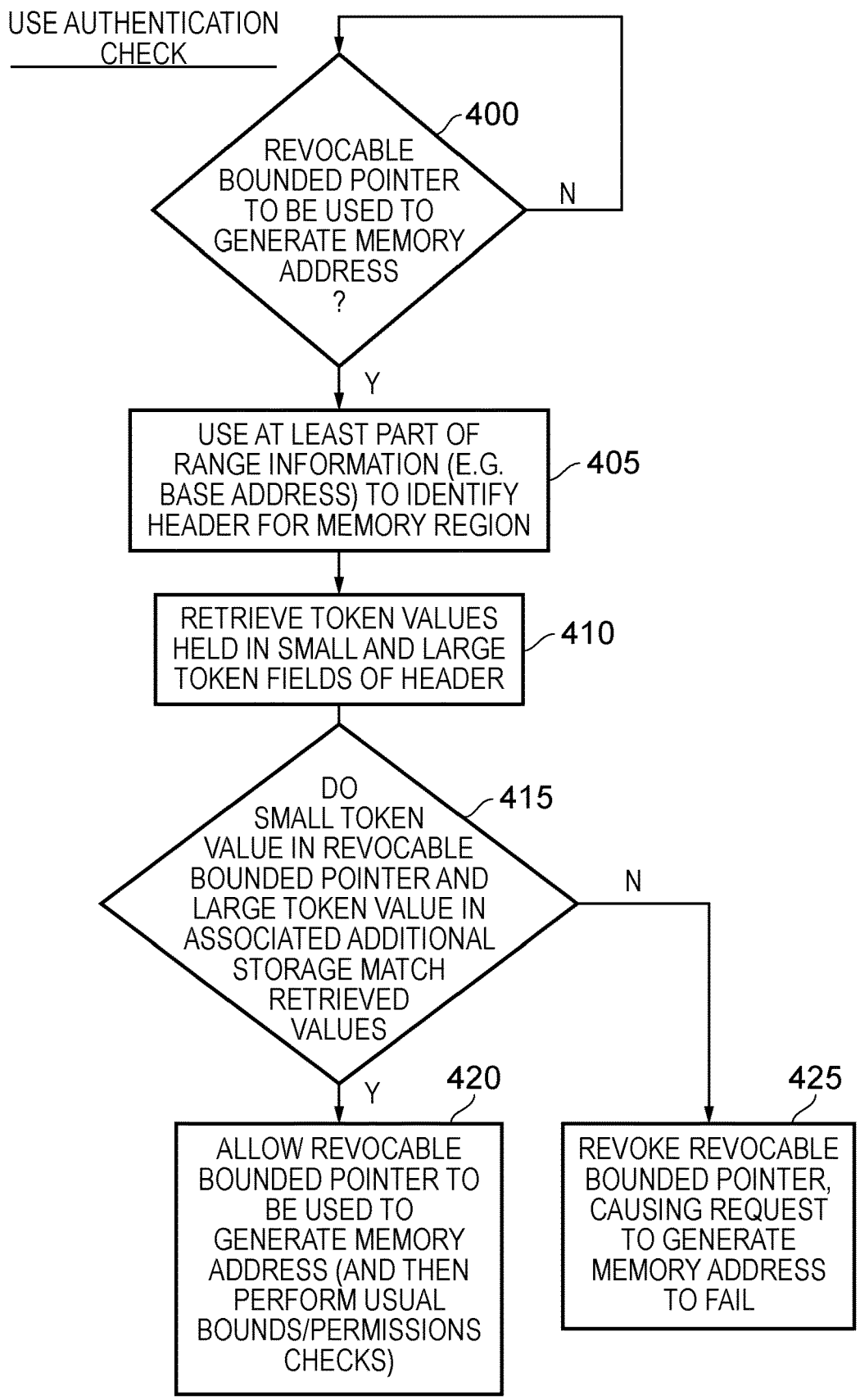
Figure 9:
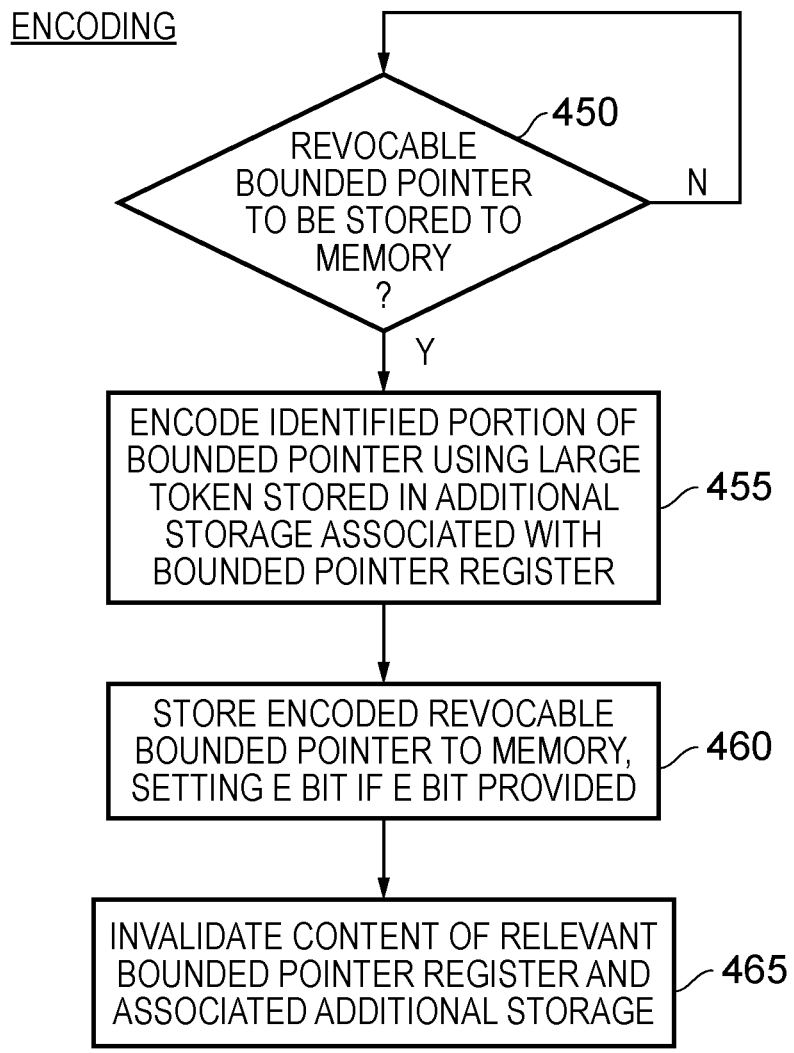
Figure 10:
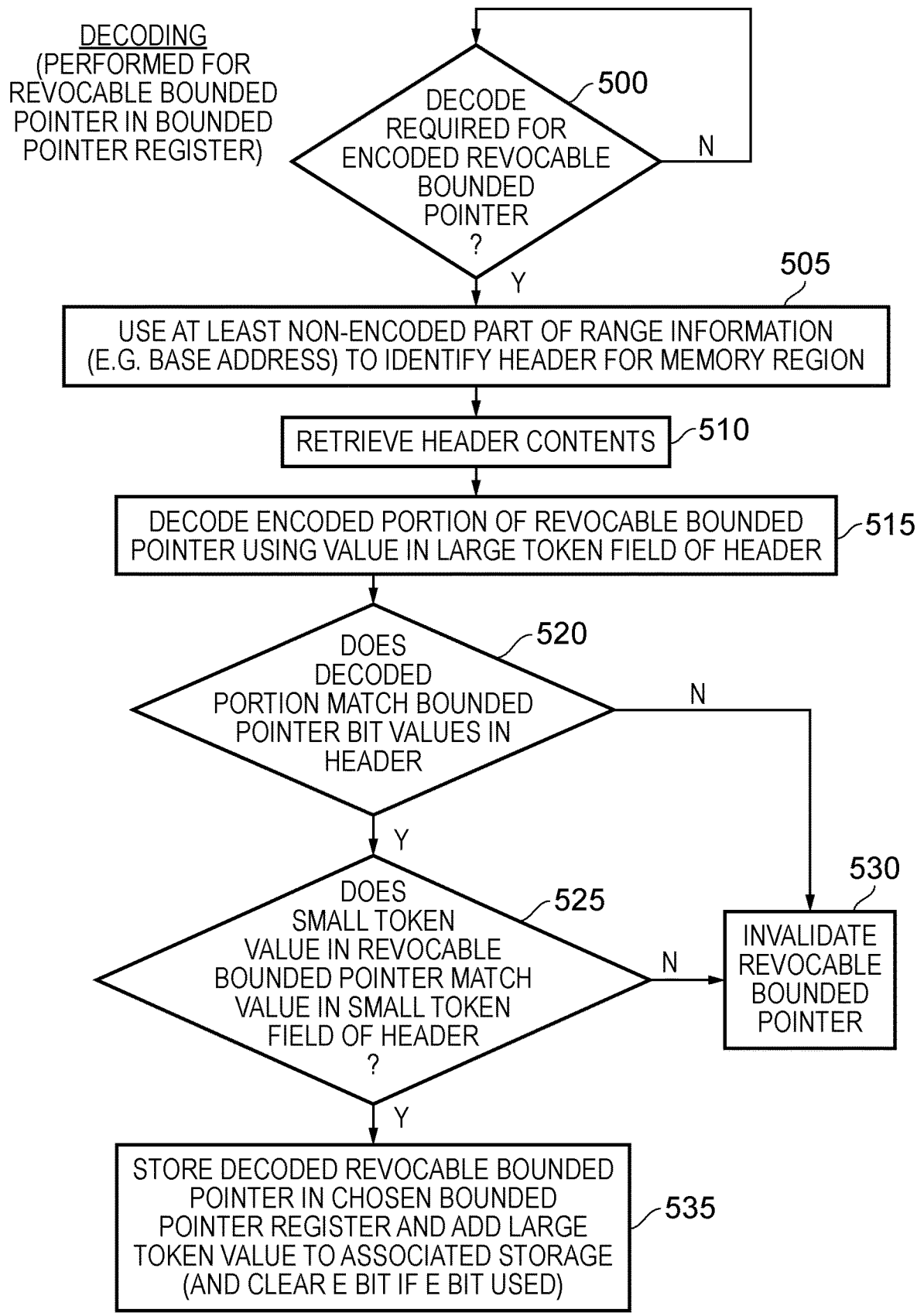
Figure 11:
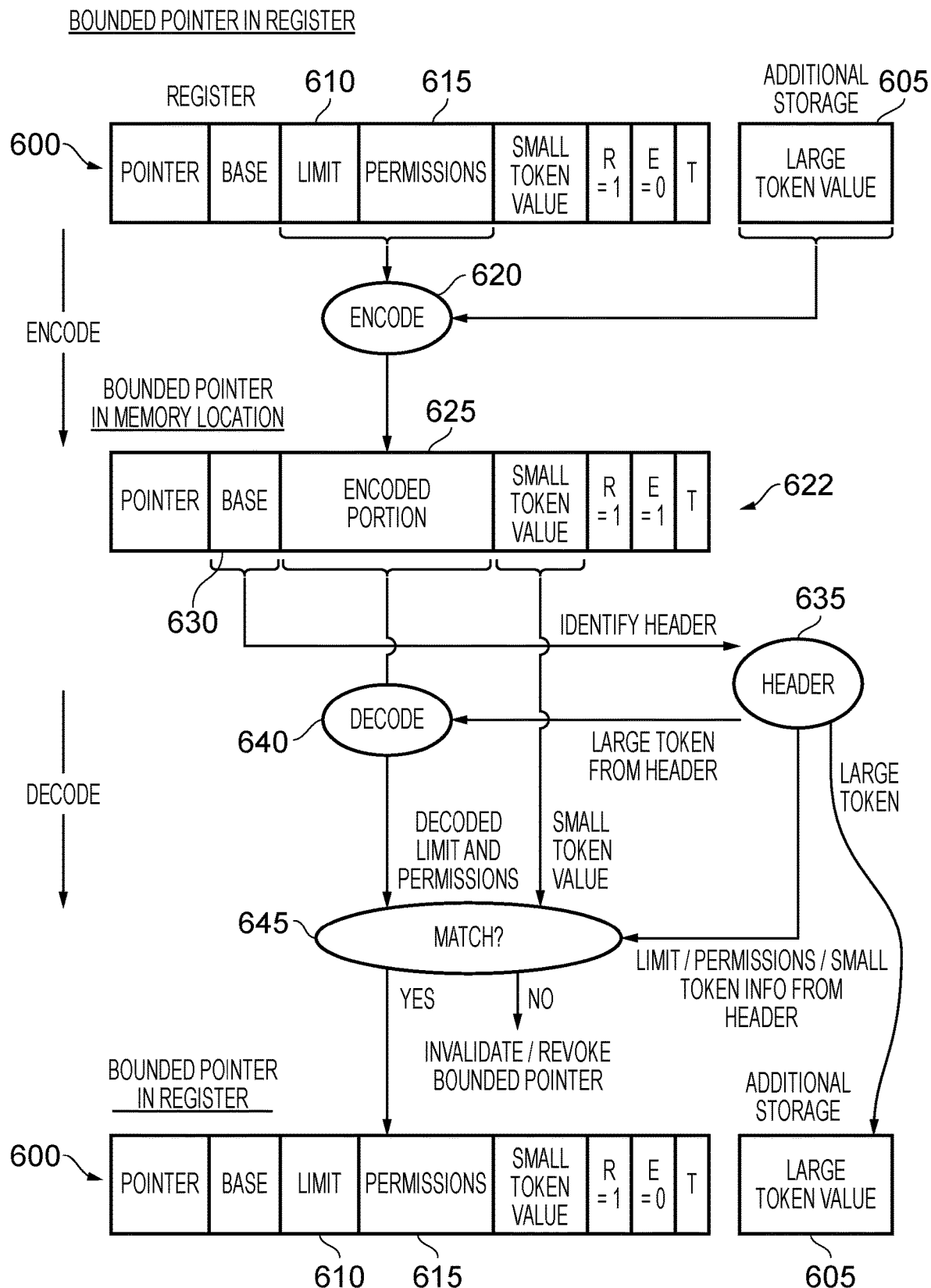
Figure 12A:
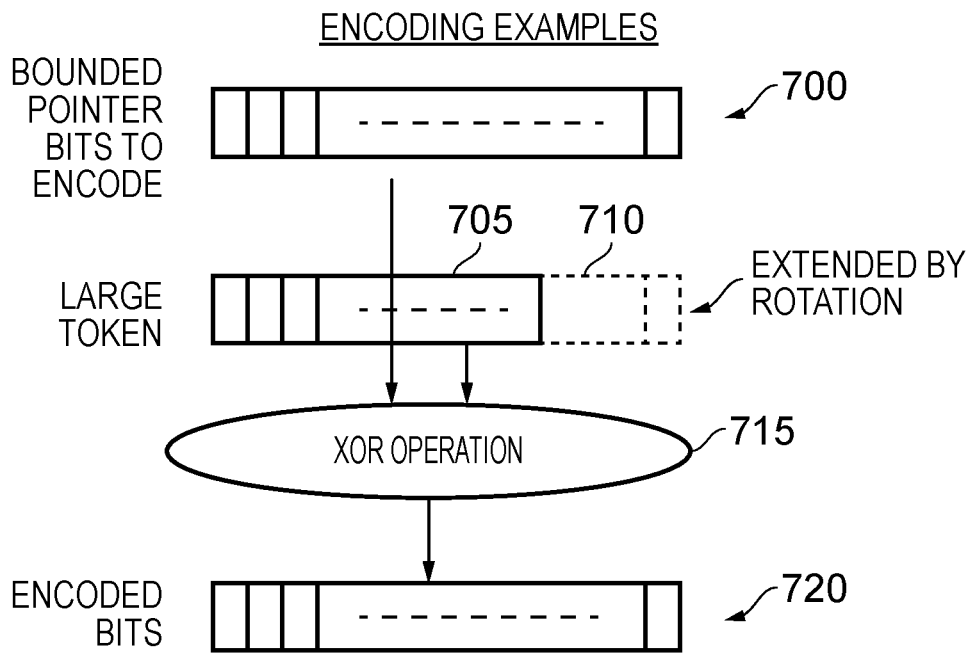
Figure 12B:
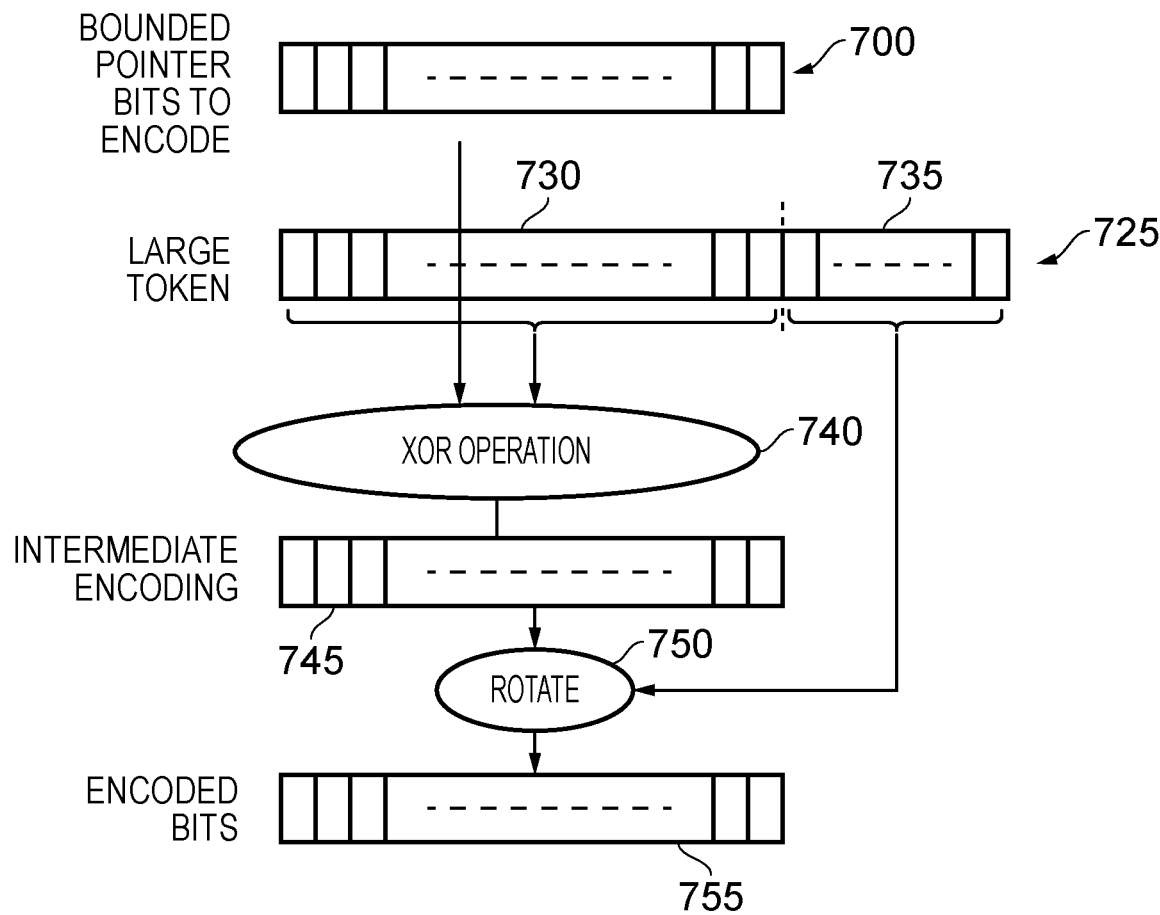
Figure 13:
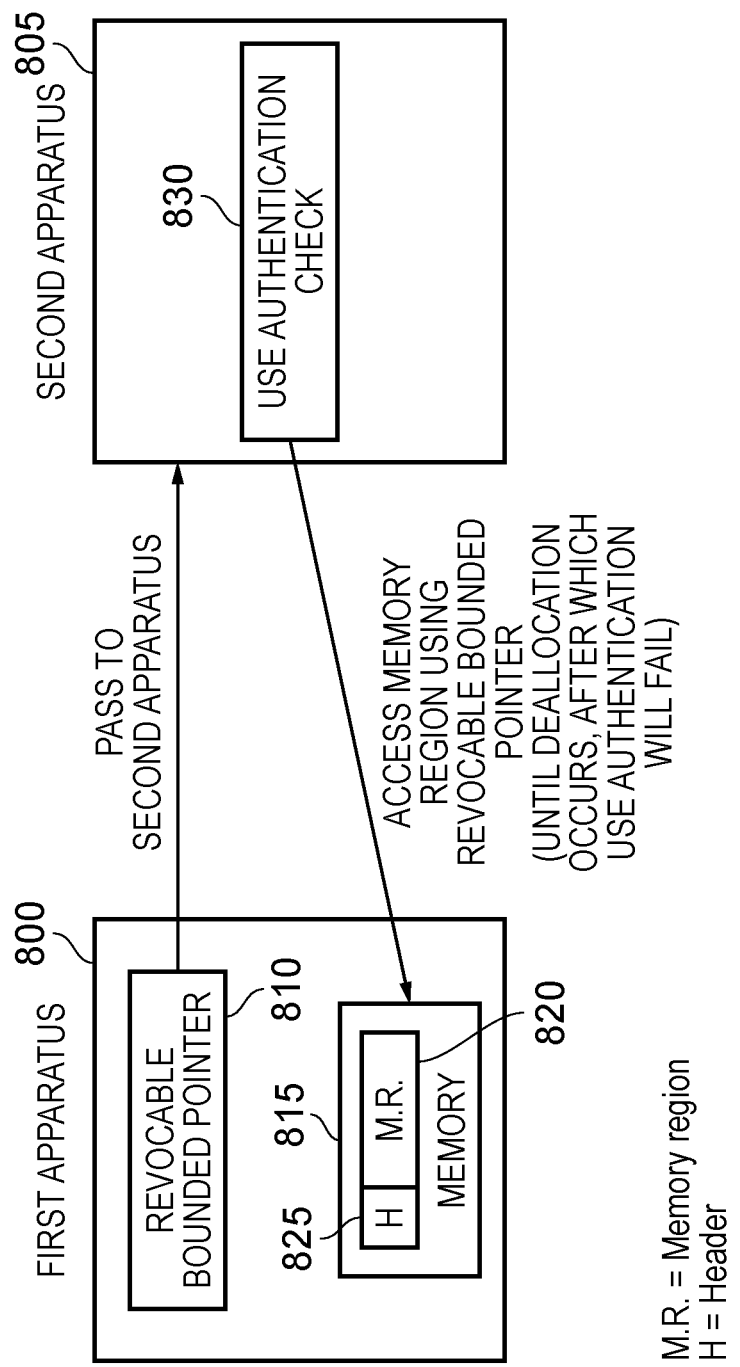

FIGS. 7A to 7C schematically illustrate an allocated memory region, an example header format for the memory region, and a generated bounded pointer, in accordance with one example arrangement;

FIG. 8 is a flow diagram illustrating a use authentication check operation performed in one example;

FIG. 9 is a flow diagram illustrating an encoding operation that may be performed in accordance with one example arrangement;

FIG. 10 is a flow diagram illustrating a decoding operation that may be performed in accordance with one example arrangement;

FIG. 11 schematically illustrates the encoding and decoding of a bounded pointer in accordance with one example arrangement;

FIGS. 12A and 12B schematically illustrate example encoding operations that may be performed; and FIG. 13 illustrates an example use case where a revocable bounded pointer generated by a first apparatus is passed to a second apparatus for use by that second apparatus until the associated memory region is deallocated, in accordance with one example arrangement.

Some processing apparatuses may support the use of bounded pointers. The pointer itself may point to, or be used to determine, the address of a data value to be accessed or an instruction to be executed, for example. However the pointer may also have associated range information which indicates an allowable range of addresses when using the pointer. This can be useful for example for ensuring that the address determined from the pointer remains within certain bounds to maintain security or functional correctness of behaviour. For example, there is increasing interest in capability-based architectures in which certain capabilities are defined for a given process, and an error can be triggered if there is an attempt to carry out operations outside the defined capabilities. The range information for a bounded pointer may be part of the capability information defined for such an architecture, and within a capability-based architecture such a bounded pointer (including its associated capability information) may be referred to as a capability.

Hence, an apparatus may have bounded pointer storage elements used to store a pointer having associated range information indicative of an allowable range of addresses when using the pointer. Each bounded pointer storage element could be a register, or a memory location in general purpose memory, for example a location on a stack memory.

Certain instructions can be used to reference such a bounded pointer storage element in order to obtain a pointer which is then used to derive an address in memory required during operation of the instruction. The pointer may be used directly to identify the memory address, or may be used to derive the memory address, for example by the addition of an offset to the pointer value.

In one example implementation, such bounded pointers are associated with particular allocated memory regions. Hence, once a memory region has been allocated, for example for use by a particular process, one or more bounded pointers may be created for use when accessing that memory region, and the range information associated with a bounded pointer will identify the range of memory addresses forming the memory region. Whenever it is desired to access an address within the memory region, that memory address can be generated with reference to such a bounded pointer, and the use of the bounded pointer will ensure that any generated memory address is constrained to be within a range of allowable memory addresses forming the memory region. In particular, if the bounded pointer is used to generate a memory address outside of the allocated memory region, then a fault will be detected, and the access will be prevented from proceeding.

Whilst this can be very useful in increasing security, as mentioned earlier a "use-after-free" issue can arise, where a bounded pointer remains accessible after the associated memory region has subsequently been deallocated. If the use of such a bounded pointer occurs due to a programming error this can lead to undefined behaviour of software. As another example, if that use occurs as an action intentionally caused by a security attacker, this can potentially lead to a security leak of information and/or remote code execution. Accordingly, it would be desirable to prevent a bounded pointer being used after the associated memory region has been deallocated. The techniques described herein aim to provide a mechanism for significantly reducing the possibility of a use-after-free situation arising.

In one example arrangement, an apparatus is provided that comprises memory allocation circuitry to allocate a memory region in memory, and bounded pointed generation circuitry to generate bounded pointers. In particular the bounded pointer generation circuitry is arranged to generate at least a revocable bounded pointer for use in accessing the memory region, the revocable bounded pointer providing a pointer value and range information identifying an address range in the memory region.

In addition, the memory allocation circuitry (which may be formed by dedicated hardware or by software running on a general purpose processor) is arranged to provide, at a header location in the memory, a header for the memory region, where the header has a first token field whose stored value is initialised to a first token value associated with the memory region. The header location is derivable from the range information provided by the revocable bounded pointer, hence enabling the header to be located when the bounded pointer is being used, thereby allowing a check in hardware to be made with reference to the header prior to allowing the revocable bounded pointer to be used.

The memory allocation circuitry is responsive to a subsequent deallocation of the memory region to modify the stored value in the first token field of the header, as a result of which it will no longer store the first token value.

In response to a request to generate a memory address using the revocable bounded pointer, a use authentication check is arranged to prevent generation of the memory address when it is determined that the stored value in the first token field has been changed.

By such an approach, at the time a revocable bounded pointer is to be used to generate a memory address, the use authentication check will prevent the access, if the stored value in the first token field of the header has been modified. It has been found that this can provide a simple and effective mechanism for significantly inhibiting the possibility of a use-after-free situation arising.

There are a number of ways in which the use authentication check can prevent generation of the memory address. In one example implementation, use authentication check is arranged to invalidate the revocable bounded pointer when it is determined that the stored value in the first token field has been changed, thereby preventing the memory address from being generated.

The manner in which the use authentication check can determine whether the stored value in the first token field of the header has been modified can be varied dependent on implementation. However, in one example, the revocable bounded pointer is arranged to store the first token value, and in response to the request to generate a memory address using the revocable bounded pointer, the use authentication check is arranged to employ the range information to determine the header location, and to invalidate the revocable bounded pointer in the absence of a match between the first token value stored in the revocable bounded pointer and the stored value in the first token field of the header.

By such an approach, at the time a revocable bounded pointer is to be used to generate a memory address, a check can be performed in hardware to determine whether the first token value provided within the revocable bounded pointer still matches the contents of the first token field of the header. As will be apparent from the above discussion, following deallocation of memory region, this will no longer be the case, and accordingly a situation can be detected where there is an attempt to use a revocable bounded pointer after the associated memory region has been deallocated, at which point the revocable bounded pointer can be invalidated to prevent the use of that revocable bounded pointer, hence preventing the requested access taking place.

In an alternative implementation, the first token value may not be reproduced within the revocable bounded pointer itself (for example due to there being insufficient space within the revocable bounded pointer to accommodate the first token value), and other mechanisms can be used to detect when the stored value in the first token field of the header has been modified. In such an implementation, the first token value may take the form of the token value referred to later herein as a second token value, and detection of a modification in that token value can be performed in the same way as discussed later herein in detail in relation to the second token value.

The first token value can be generated in a variety of ways, but in one example implementation the apparatus further comprises token generation circuitry to generate the first token value. In one particular example, the token generation circuitry is a pseudo random number generator, with the first token value then being a pseudo random number generated for use in association with the allocated memory region and the associated revocable bounded pointer(s).

In some implementations, the bounded pointer generation circuitry may be arranged to generate not only the above described revocable bounded pointers, but also other bounded pointers that do not make use of the first token value. To assist in distinguishing the different types of bounded pointers, the bounded pointer generation circuitry can be arranged to provide a revocable field in each generated bounded pointer, which is set when the generated bounded pointer is the revocable bounded pointer. When the revocable field is set, and the bounded pointer is to be used to generate a memory address, then the above described use authentication check can be performed in hardware prior to allowing the revocable bounded pointer to be used, with the revocable bounded pointer being invalidated if there is not a match between the first token value provided by the revocable bounded pointer and the stored value in the first token field of the header for the associated memory region.

The bounded pointers can be stored at a variety of locations within the system. In one example arrangement, the apparatus comprises a set of bounded pointer registers, where each bounded pointer register is arranged to store a bounded pointer for use in generating memory addresses. When processing circuitry of the apparatus is executing instructions, and execution of those instructions requires a memory address to be generated using a bounded pointer, the relevant bounded pointer can be accessed within a specified one of the bounded pointer registers. The bounded pointer registers may be dedicated registers for storing bounded pointers, or general purpose registers that can store a variety of types of data, including bounded pointers.

In one example, the bounded pointers can be moved between the bounded pointer registers and memory, or indeed copied from registers to memory or vice versa, so that not all bounded pointers will at any particular point in time reside within one of the bounded pointer registers.

In implementations where the first token value is stored in the revocable bounded pointer, the size of the first token value is constrained by the space available within the revocable bounded pointer to hold the first token value. In particular, in one example arrangement, the first token value is located within a portion of a bounded pointer that is otherwise unused. In some implementations, the size of the first token value that can be stored within the bounded pointer may provide a sufficient level of protection against the "use-after-free" situation. However, the larger the number of bits allocated to the token value, the more robust the mechanism is against the use-after-free scenario. For example, when a random token value is generated for use with a particular memory region, then the larger the token value is the less likelihood there is that the same token value will also have been generated for use with another previously allocated memory region, for which a bounded pointer may still be active, and accordingly the less the possibility that that existing bounded pointer could be used to access the later allocated memory region after the previously allocated memory region has been deallocated (which is effectively another type of use-after-free access that would be desirable to prevent).

In one example embodiment, if it is desirable to increase the effective token size, then a second token value could be used in combination with the first token value, where the header retains both the first token value and the second token value, but the second token value itself is not provided within the revocable bounded pointer due to lack of space to accommodate that second token value.

In particular, in one example arrangement, the header further comprises a second token field arranged to store a second token value associated with the memory region, the second token value being absent from the revocable bounded pointer generated by the bounded pointer generation circuitry, and the use authentication check is arranged to invalidate the revocable bounded pointer when it is determined that the second token value has been changed.

There are a number of ways that the use authentication check can determine when the second token value has been changed. For example, in one implementation, the apparatus may comprise additional storage provided in association with the set of bounded pointer registers, wherein when the revocable bounded pointer is stored in a selected bounded pointer register, the additional storage is arranged to identify, in association with the selected bounded pointer register, the second token value as initialised in the second token field of the header. Hence, in accordance with such an implementation, the second token value is stored in the header region, and additional storage is provided in association with a set of bounded pointers, so that when a revocable bounded pointer is stored in one of the bounded pointer registers, the additional storage can maintain the second token value in association therewith, thus enabling the use authentication check discussed earlier to be extended so that both the first and second token values can be compared with the corresponding values held within the header, and the revocable bounded pointer can be invalidated if either of those token values do not match the corresponding values in the header.

Hence, in one such example arrangement, the use authentication check may be further responsive to the request to generate a memory address using the revocable bounded pointer as stored in the selected bounded pointer register, to invalidate the revocable bounded pointer in the absence of a match between the second token value stored in the header and the second token value stored in the additional storage in association with the selected bounded pointer register. Hence, as mentioned earlier, both the first token value and the second token value can be referred to when determining whether the revocable bounded pointer should continue to be used, or should be revoked.

The additional storage can be provided in a variety of ways. For example, it could be physically separate to the storage providing the set of bounded pointer registers, provided there is a mechanism to associate each second token value stored within the additional storage with a particular one of the bounded pointer registers. Alternatively, the additional storage may be provided by the same storage structure that provides the set of bounded pointer registers, with the additional storage being viewed as providing an extension to each of the bounded pointer registers to enable not only a bounded pointer to be stored therein, but also the associated second token value.

To increase security, and in particular to alleviate the potential risk of second token values being tampered with, the additional storage can be arranged to be inaccessible to one or more types of software executing on the apparatus (in one implementation this could be any software executing on the apparatus). Hence, the additional storage will be populated directly under hardware control, and will be referred to by hardware when performing the use authentication check.

In an alternative implementation, the additional storage may not be required. For example the apparatus may further comprise a notification mechanism to identify when a write operation has been made to at least one of the first token field and the second token field of the header, thereby enabling the use authentication check to invalidate the revocable bounded pointer in the event that either the first token value or the second token value has been changed. The notification mechanism can take a variety of forms, but in one implementation is based on a cache-coherency protocol, with the header being cached within a cache of the apparatus.

In implementations that employ both the first token and the second token, on a subsequent deallocation of the memory region, the memory allocation circuitry can be arranged to modify not only the value stored in the first token field of the header but also the value stored in the second token field of the header, so that neither the first nor second token values should thereafter match with the information maintained in association with the revocable bounded pointer after the memory region has been deallocated.

The second token value can be generated in a variety of ways, but in one implementation is generated using the token generation circuitry that is also arranged to generate the first token value. Hence, in one example implementation example, the second token value is also a pseudo random number generated for use in association with the memory region.

In implementations where the second token value is used in addition to the first token value, an issue that arises is how to maintain information indicative of the second token value if a revocable bounded pointer is stored from a bounded pointer register back to memory. As mentioned earlier, the second token value itself does not form part of the revocable bounded pointer, and accordingly when the revocable bounded pointer is stored to memory the second token value will not form part of the revocable bounded pointer stored in memory. In accordance with one example implementation, this issue is addressed through use of an encoding operation.

In particular, in one implementation, the header is arranged to store a copy of a portion of the revocable bounded pointer, and the apparatus further comprises coding control circuitry arranged, when the revocable bounded pointer is to be stored to the memory from the selected bounded pointer register, to perform an encoding operation to create an encoded revocable bounded pointer by encoding the portion of the revocable bounded pointer using the second token value in a manner that allows the portion of the revocable bounded pointer to be recreated using the second token value and the encoded revocable bounded pointer, whereafter the encoded revocable bounded pointer is stored to the memory. Hence, the revocable bounded pointer is stored in an encoded form within memory. Later, the encoded form can be retrieved from memory, and decoded prior to storing in a bounded pointed register. Provided the decoding operation is successful (which requires the decoding of the encoded portion of the revocable bounded pointer using the second token value in the header to produce a decoded portion that matches the copy of the portion of the revocable bounded pointer that is stored within the header), then the decoded revocable bounded pointer can then be used for subsequent memory access operations, provided the earlier use authentication check is passed.

It will be appreciated that the copy of the portion of the revocable bounded pointer that is stored within the header can be stored in any suitable format. Hence, whilst it may be stored in the original format used within the revocable bounded pointer, it could alternatively be stored in a different format if desired (for example it could be stored as a bitwise inverse version of the corresponding bits stored in the revocable bounded pointer).

The first token value could additionally be used if desired during the encoding operation, and if so will also be referred to when performing the corresponding decoding operation.

The portion of the revocable bounded pointer that has a copy stored within the header can take a variety of forms, but in one example implementation is a portion that is common to any bounded pointer generated for a currently allocated instance of the memory region. There will be a number of fields within a revocable bounded pointer that will be common to any bounded pointer generated for the currently allocated instance of the memory region. This will include for example the range information used to identify the range of the memory region, but can also include certain permission bits. In one particular example, the portion of the revocable bounded pointer for which a copy is stored in the header comprises at least a portion of the range information that is not required to identify the header location. By excluding the portion of the range information that is required to identify the header location, then this enables the header location to be identified prior to performing the required decoding operation.

The range information can take a variety of forms, but in one implementation comprises a base address and a limit address for the memory region, the header location is determined using one of the base address and the limit address, and the portion of the revocable bounded pointer for which a copy is stored in the header identifies the other of the base address and the limit address.

As mentioned earlier, the portion of the revocable bounded pointer for which a copy is stored in the header can also include other information, for example information indicative of at least one or more permissions specified within the revocable bounded pointer. Indeed, in one specific implementation, it may be only the permission information that has a copy stored in the header, for example if in the encoding/decoding operation only the permission bits are encoded/decoded.

The coding control circuitry can then be arranged to decode the revocable bounded pointer by performing a decoding operation to decode the encoded portion of the revocable bounded pointer using the value stored in the second token field of the header (and the value stored in the first token field if the first token value was also used in the encoding operation) to produce a recreated portion of the revocable bounded pointer, and to then perform a check operation to determine whether the recreated portion of the revocable bounded pointer matches the copy of the portion of the revocable bounded pointer stored in the header. In particular, the portion of the range information that has not been encoded can be used to identify the header location, hence enabling the contents of the header to be retrieved, whereafter the value stored in the second token field (and optionally also the first token field) can be used to decode the encoded portion of the revocable bounded pointer. Provided the value stored in the second token field is still the second token value (and the value stored in the first token field is still the first token value if the first token is also used in the encoding/decoding process), then the recreated portion should still match the copied portion of the revocable bounded pointer stored in the header. However, if the header has been changed, for example because the associated memory region has been deallocated, then the decoding operation will not produce a recreated portion of the revocable bounded pointer that matches the copied portion of the revocable bounded pointer stored in the header. If such a situation arises, then the coding control circuitry may be arranged to invalidate the revocable bounded pointer. In addition, in one implementation, once the revocable bounded pointer has been decoded, a check is also performed to make sure that the first token value in the revocable bounded pointer matches the stored value in the first token field of the header, and if that is not the case the revocable bounded pointer is also invalidated.

The decoding operation can be triggered for a variety of reasons. In one example implementation, the coding control circuitry is arranged to perform the decoding operation whenever an encoded revocable bounded pointer is to be loaded from the memory into one of the bounded pointer registers. Hence, in such an implementation a revocable bounded pointer is always encoded when it is stored to memory, and always decoded when it is retrieved from memory into a bounded pointer register.

However, in an alternative implementation, it may be possible to retrieve an encoded revocable bounded pointer into a bounded pointer register without decoding it. For example, this would allow a bounded pointer to be copied between memory locations without the requirement to perform a decode step and a corresponding encode step. However, in such an implementation it needs to be ensured that an encoded bounded pointer cannot be used to perform a memory access operation. Accordingly, in one such implementation, each bounded pointer includes an encoding field which is set to indicate when a revocable bounded pointer has been encoded. This hence enables the processing hardware to distinguish between a revocable bounded pointer stored in a bounded pointer register that is still in encoded form (and hence cannot be used for memory access) and one that is in a decoded form (and hence can potentially be used for a memory access provided that the use authentication check is passed).

In such an embodiment, an encoded revocable bounded pointer is required to be decoded by the coding control circuitry prior to that revocable bounded pointer being used to generate a memory address.

The physical location of the header relative to the associated memory region can take a variety of forms, provided the header location can be identified from the range information for the memory region. In one example implementation, the header location is arranged relative to the memory region so as to be one of: a sequence of memory addresses immediately preceding the allocated memory region or at a fixed offset before the allocated memory region; a sequence of memory addresses immediately following the allocated memory region or at a fixed offset after the allocated memory region; a sequence of memory addresses at a location determined by performance of a computation based on an address of the memory region.

Whilst in one implementation the sequence of memory addresses used to hold the header may be software addressable, in an alternative implementation the header location may be within a portion of memory that is not addressable by at least some types of software executing on the apparatus. For instance the header may be formed from non-software-addressable memory bits (for example similar to the way in which ECC bits may be stored in association with data values). If desired, the header location may be accessible by certain privileged software (such as the kennel and possibly one or more other software components with a suitable level of privilege) but inaccessible to less privileged software (e.g. user-space software).

As a further example, the header location may be representable in an address space that is separate to the address space containing the allocated memory region. In such an arrangement, the separate address space may still be addressable by software, but in a manner different to the manner in which the usual address space is addressed (for example, addressing this separate address space may require using special CPU instructions). In such an arrangement, the header location in the separate address space may still be arranged so that it can be located using the allocated memory region's range information.

If the header is within a portion of memory that is not addressable by certain types of software executing on the apparatus, this can further improve security, by avoiding any potential risk of that software modifying the header information.

In one implementation, the portion of the revocable bounded pointer for which a copy is stored in the header may be predetermined. However, alternatively a control field may be provided within the header to identify which bits of the revocable bounded pointer have been used to form the copied portion of the revocable bounded pointer stored in the header. This can provide a level of configurability as to the choice of the bits of the revocable bounded pointer that are maintained within the header, for use in the earlier-described encoding and decoding operations. In one particular implementation, the control field may be at least partly provided by a portion of the first and/or second token fields, such that for example a first part of the first/second token value is used as the "encryption key" when performing encoding/decoding, and another part (possibly intersecting with the first part) is used as the control field value to determine which bits of the revocable bounded pointer are to be encoded/decoded.

It should be noted that when performing the use authentication check, it will not necessarily be the case that memory needs to be accessed in order to obtain the header information. For example, the apparatus may further comprise a cache structure arranged to maintain a copy of the stored value in the first token field of the header (and optionally the value stored in the second token field in implementations using the second token), wherein the use authentication check is arranged to reference the copy maintained in the cache structure when determining whether the stored value in the first token field has been changed. In modern data processing systems, cache coherency schemes are used to ensure that the contents maintained by the various caches within the system represent the most up-to-date version of the data cached therein, and accordingly if contents of the header have been cached, and those cached contents are still valid at the time the use authentication check is being performed, then those cache contents can be used in order to determine whether the stored value in the first token field has been changed. Hence, this can significantly reduce the time taken to perform the use authentication check.

Indeed, in some system, it may be possible for a core using the bounded pointer (this core being referred to as the current core below) to avoid performing the use authentication check at all until the cache coherency scheme advises of an update to the cached version of the header, or the current core updates the header. For example, the cache coherency scheme may be able to track writes to a header associated with a bounded pointer, once the bounded pointer is loaded into a bounded pointer register and the corresponding header is stored within the cache. Thus, for instance, if another core writes to the location containing the header, this would cause a coherency-invalidate request to be sent to the current core, and hence by this mechanism the current core receives a message indicating the possible change of the header. As a result, it could avoid performing an authentication check until it receives such a coherency-invalidate request due to an update by another core, or until such time as it writes to the header itself, since before that time it is known that the header has not changed. Once a change has been made to the header, the use authentication check can then be arranged to determine that the revocable bounded point is to be invalidated.

There are many example use cases where the provision of a revocable bounded pointer using the mechanism described above can be very useful. In one example use case, the apparatus is arranged to provide the revocable bounded pointer to a further apparatus to control access to the memory region by the further apparatus, and the further apparatus is arranged to perform the use authentication check, whereby after the apparatus has deallocated the memory region, the further apparatus will be prevented from further use of the revocable bounded pointer to generate a memory address. Hence, by such an approach, an apparatus can create a bounded pointer that it can pass to another apparatus, with the above described mechanism ensuring that once the apparatus decides to deallocate the relevant memory region, that further apparatus will no longer be able to use the provided bounded pointer, and in particular that bounded pointer will be revoked when any attempt is made to use it after the associated memory region has been deallocated.

Particular examples will now be described with reference to the Figures.

Figure 1:
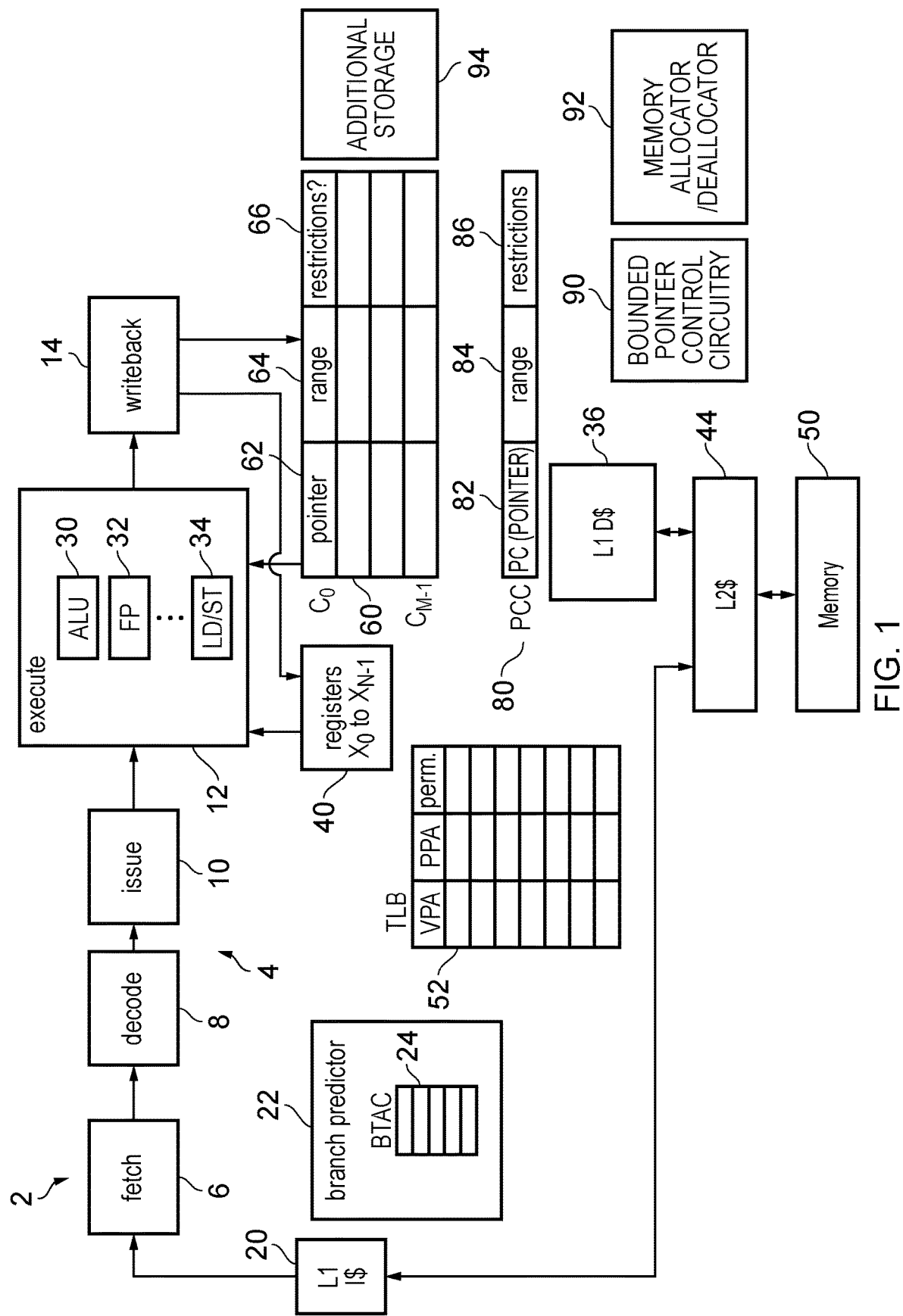
FIG. 1 is a block diagram of an apparatus in accordance with one example.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some implementations. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some implementations may support in-order processing so that instructions are issued for execution in an order corresponding to the program order in which instructions were fetched from the L1 instruction cache 20. Other implementations may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first. The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some implementations, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

As shown in FIG. 1, the apparatus 2 may have a set of bounded pointer registers 60. Whilst the set of bounded pointer registers is shown in FIG. 1 as being physically separate to the set of general purpose data registers 40, in one implementation the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to herein as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an implementation where the same physical storage is used for both general purpose data registers and bounded pointer registers, then in one implementation the pointer value 62 may for example be stored within the same storage location as used for a corresponding general purpose register.

Figure 2:
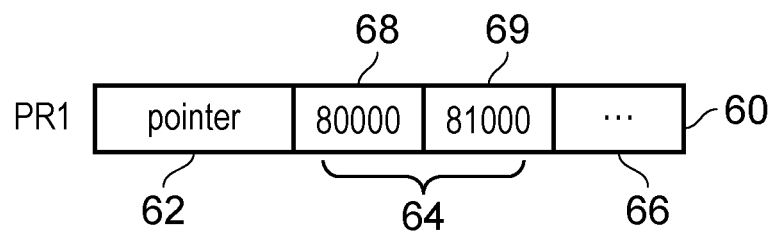
FIG. 2 shows examples of types of instruction for which an error may be triggered if there is an attempt to set or access a pointer value within the set of bounded pointer storage elements, where that pointer value is used to specify an address outside the range indicated by the associated range information.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception states of the processor 4. Any known technique for setting or modifying the range information 64 could be used.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

Figure 3:
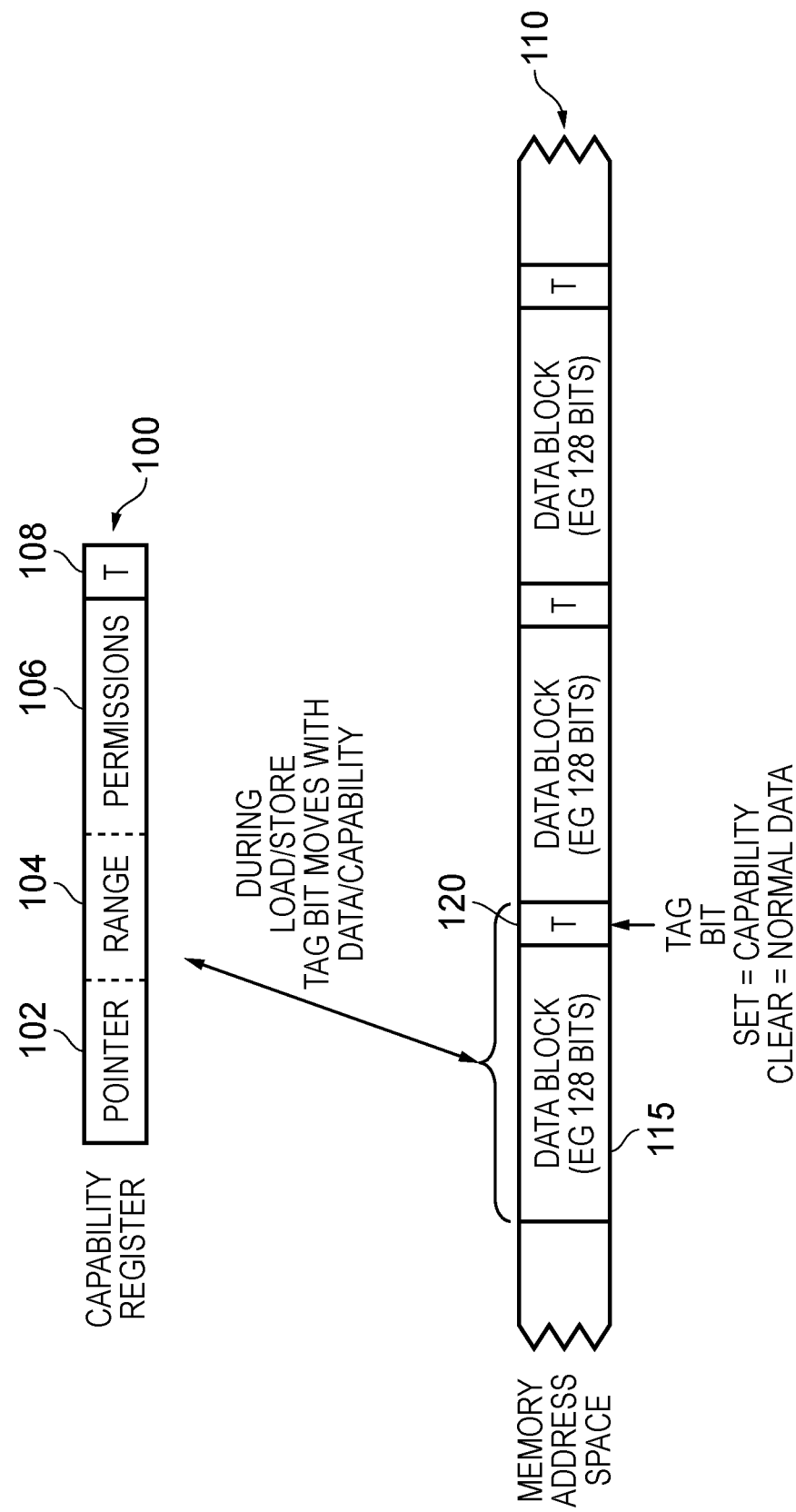
FIG. 3 illustrates the use of a tag bit in association with bounded pointers, in accordance with one example.

FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on implementation, but purely by way of illustration, in one example implementation if the tag bit has a value of 1, it indicates that the associated data block is a capability, and if it has a value of 0 it indicates that the associated data block contains normal data.

When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

Returning to FIG. 1, in accordance with the techniques described herein revocable bounded pointers can be generated that, in addition to the usual information associated with a bounded pointer, includes a first token value associated with a corresponding memory region for which that bounded pointer is to be used to control access. Further, for use in association with revocable bounded pointers that relate to the allocated instance of the memory region, a header is provided that is stored at a header location in memory, where that header has a first token field whose stored value is initialised to the first token value that is to be used in association with the revocable bounded pointer. The header location is arranged to be derivable from the range information provided by the revocable bounded pointer, hence enabling the header to be located at the time the bounded pointer is to be used to generate a memory address. When an allocated memory region is subsequently deallocated, then the stored value in the first token field is modified.

FIG. 1 schematically shows components used to manage the use of revocable bounded pointers and the headers provided in association with the corresponding memory regions. In particular, as shown bounded pointer control circuitry 90 is provided for controlling the generation of bounded pointers, and the moving of those bounded pointers between the capability registers 60 and the cache hierarchy 36, 44 and/or memory 50. Further, memory allocator/deallocator circuitry 92 is provided for allocating memory regions within memory, for example to enable them to be used by particular processes being performed on the data processing apparatus, and for subsequently deallocating those memory regions. The memory allocator/deallocator circuitry is also responsible for maintaining the header for each memory region.

In some embodiments the bounded pointer control circuitry 90 and the memory allocator/deallocator 92 can be provided by dedicated hardware components. Alternatively, they may be implemented on the existing hardware of the data processing apparatus under the control of trusted code, for example secure code, or an operating system or hypervisor. In instances where any of these components are implemented by software, the bounded pointer semantics should still be enforced by hardware.

As also shown in FIG. 1, additional storage 94 is provided in association with the set of bounded pointer registers 60. This may be provided as a separate storage component to the storage used to provide the bounded pointer registers 60, or may be provided within the same component, effectively providing an extension to each of the bounded pointer registers so that they can store not only the bounded pointer, but also some additional information stored at a corresponding location in the additional storage 94. In particular, as will be discussed in more detail later, for revocable bounded pointers, the relevant location in the additional storage associated with a bounded pointer register can be used to store a second token value which is also maintained in a header provided for the memory region that is associated with the revocable bounded pointer stored in that bounded pointer register.

In some implementations it may be desirable to provide a revocable program counter capability, and in such instances further additional storage can also be provided in association with the PCC register 80.

Figure 4:
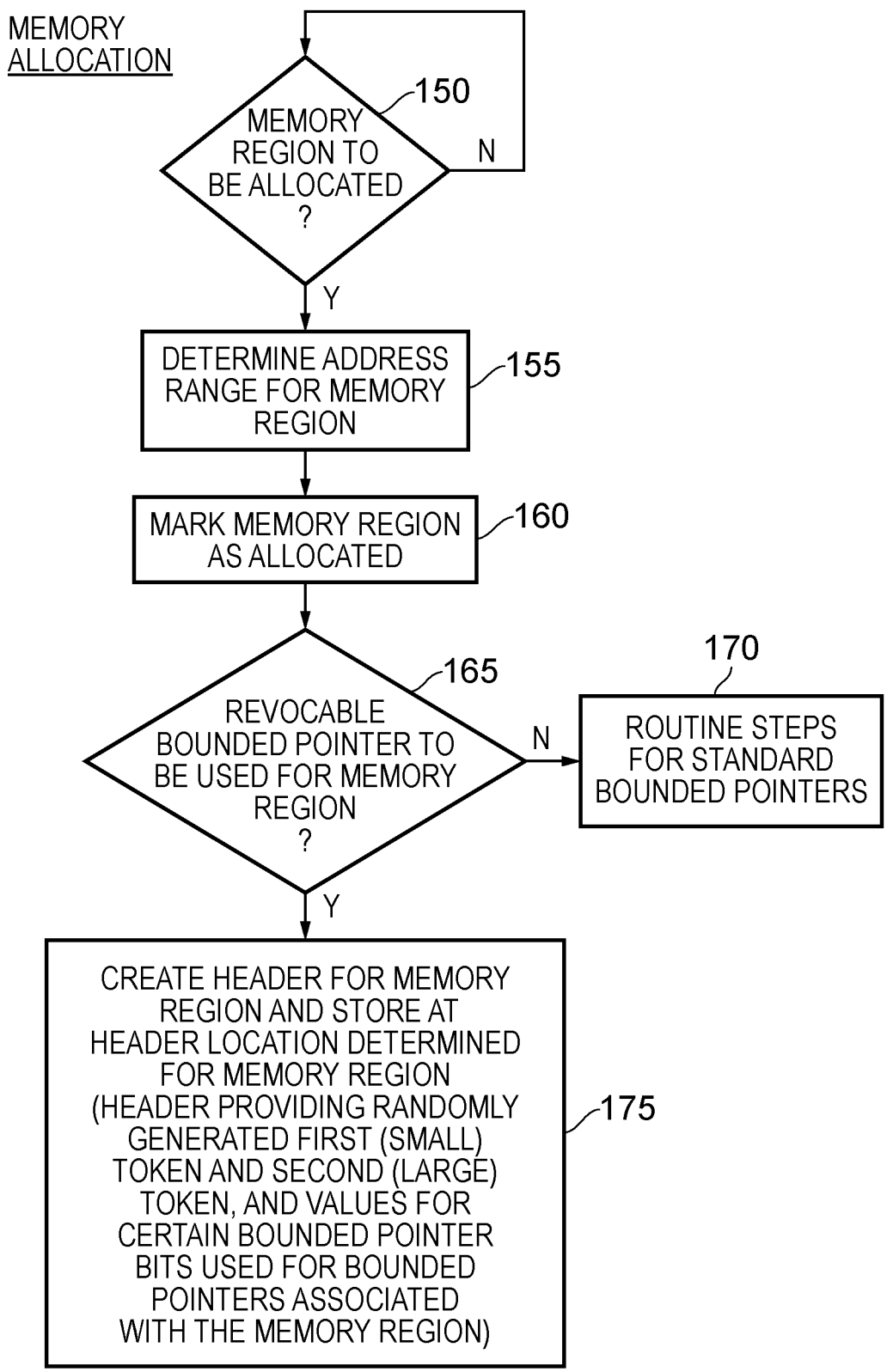
FIG. 4 is a flow diagram illustrating a memory allocation process in accordance with one example.

FIG. 4 is a flow diagram illustrating a memory allocation operation that can be performed by the memory allocator/deallocator circuitry 92 in one example implementation. At step 150, it is determined that a new memory region needs to be allocated. This can be triggered by the software being executed on the processing circuitry, for example due to a portion of memory needing to be provided for use by a particular process or task being performed on the data processing apparatus. Once a new memory region is to be allocated, then at step 155 an address range for the memory region is determined using any of a number of standard memory allocation techniques, and then the identified memory region is marked as allocated at step 160, so as to reserve the range of memory addresses forming the memory region for use by the associated task or process. If a revocable bounded pointer is to be constructed for the memory region, and the associated header is to be located in software-addressable memory bits, then a portion of memory also needs to be reserved for storage of the header.

At step 165, it is then determined if a revocable bounded pointer is to be used for the memory region. In particular, in one implementation, it may be the case that revocable bounded pointers are supported, but also standard bounded pointers may be usable, and hence in some instances it may be decided that standard bounded pointers will be used for a particular memory region. If revocable bounded pointers are not going to be used, then the process at this point can proceed to step 170, where routine steps can be performed that relate to the use of standard bounded pointers.

However, assuming the allocated memory region is to have at least one revocable bounded pointer associated with it, then the process proceeds to step 175 where a header is created for the memory region, and that header is then stored at a header location that is determined for the memory region. As will be discussed in more detail below, the header location can take a variety of different forms, provided the header location is determinable using the range information provided in the associated revocable bounded pointer. The content of the header can take a variety of forms, but in one described implementation provides a first token (also referred to as a small token herein), a second token (also referred to as a large token herein), and values for certain bounded pointer bits that will be used for bounded pointers associated with the memory region. The bounded pointer bits that are maintained within the header can take a variety of forms, but will typically be bits of the bounded pointer that will be common for any bounded pointers created for use in association with the currently allocated instance of the memory region. As an example, this can include a portion of the range information, since the range information will be common to the bounded pointers allocated for the particular memory region, in one embodiment the range information identifying the base address and limit address of the memory region. Further, certain permission bits may be common to the bounded pointers created for use in association with the memory region, and one of more of those permission bits may be included within the information held within the header.

As will be apparent from the later discussion, the values of the certain bounded pointer bits are retained in the header for use in an encoding operation and corresponding decoding operation when a bounded pointer is moved between the bounded pointer registers 60 and memory. In particular, the large token cannot be accommodated within the revocable bounded pointer itself (in contrast to the small token which is in one example implementation incorporated within the revocable bounded pointer in a series of bits which are otherwise unused in the bounded pointer format). Accordingly, whilst the large token information can be maintained in the corresponding portion of the additional storage 94 whilst the revocable bounded pointer is present within one of the bounded pointer registers 60, when the bounded pointer is stored out to memory the large token information cannot be maintained. Accordingly, in one example implementation, a portion of the revocable bounded pointer (namely the portion that corresponds to the portion maintained within the header) will be subjected to an encoding operation using the large token in order to generate an encoded portion, the encoding operation being of a form which later enables the large token to be used to decode that encoded portion so as to restore it back to its original contents, and then the encoded form of the revocable bounded pointer is stored to memory.

In an alternative implementation, it may be sufficient to use the small token, with no second token being provided. In that instance, the header may merely need to provide an indication of the small token, and will not identify the second token, or the values of certain bits of the bounded pointer. Further, no encoding and decoding operation will be required, since the first token value can be incorporated directly within the revocable bounded pointer, and hence can be maintained as the revocable bounded pointer is moved between the bounded pointer registers 60 and memory 50, in either direction. However, the robustness of the mechanism in preventing use-after-free scenarios is improved when the overall size of the token is increased, and accordingly for the purposes of the example implementation described hereafter, it will be assumed that the overall token is represented by the small token (which can be represented directly within the bounded pointer) and the large token (which cannot be represented directly within the bounded pointer), and both tokens are used when deciding whether to revoke a revocable bounded pointer. This will be discussed in more detail with reference to the remaining figures.

Figure 5:
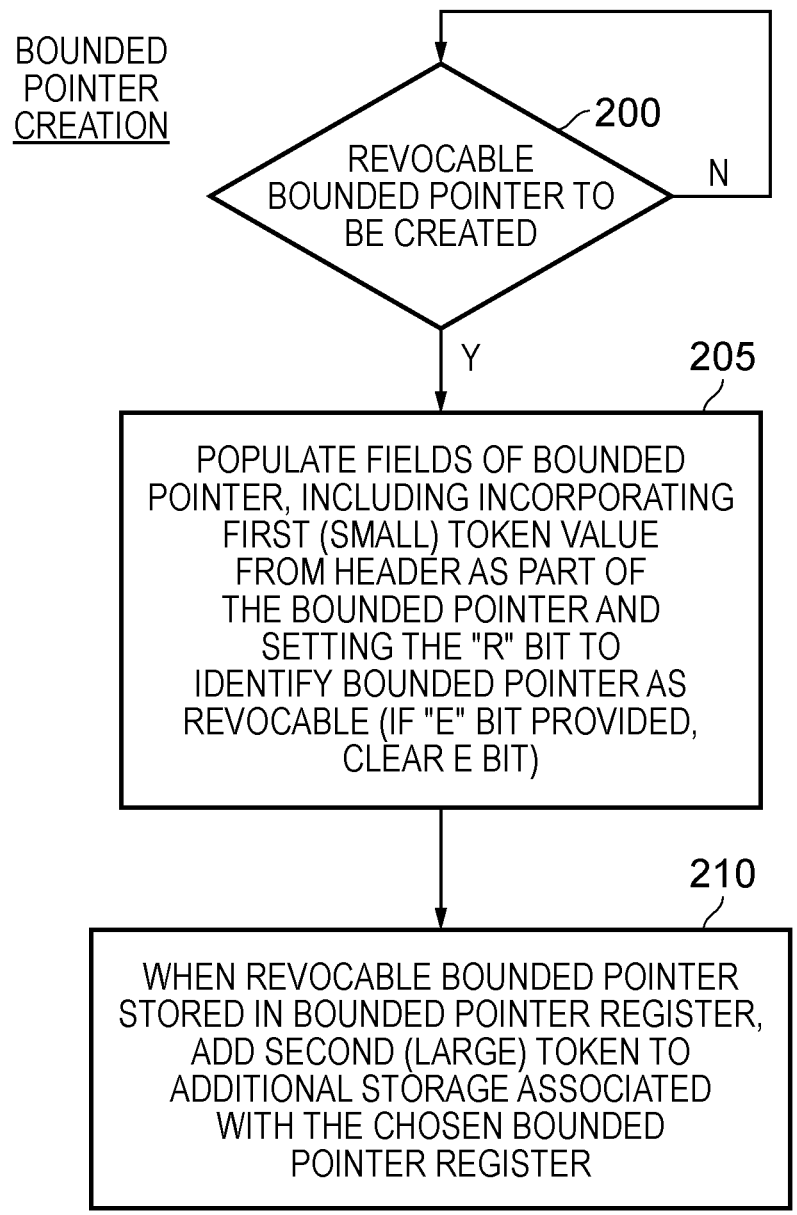
FIG. 5 is a flow diagram illustrating a bounded pointer creation operation in accordance with one example.

FIG. 5 illustrates a bounded pointer creation process that can be implemented by the bounded pointer control circuitry 90. In particular, the process describes the sequence of events that occurs when a revocable bounded pointer is to be created, as determined at step 200. Once a revocable bounded pointer is to be created, then at step 205 the fields of the bounded pointer are populated with the required information, including the usual pointer, range and permissions information. However, in addition the bounded pointer will be populated so as to incorporate the small token value as stored in the small token field of the header of the associated memory region. In addition, in the example implementation described herein, a revocable (R) bit is provided within the bounded pointer, which can be set to identify that the bounded pointer is a revocable bounded pointer. In contrast, if a standard bounded pointer is being created, no first token value will be incorporated within the bounded pointer, and the R bit will be cleared.

As will also be discussed in more detail later, in one implementation an encoded (E) bit is provided which can be set to identify that the revocable bounded pointer is in an encoded form and which can be cleared to identify that the revocable bounded pointer is in a decoded form. If an implementation uses the E bit information, then at step 205 the E bit is cleared since at the point of creating the bounded pointer, it will in one example be created in one of the bounded pointer registers 60 in an unencoded form.

At step 210, the revocable bounded pointer will be stored within a selected bounded pointer register 60, and the large token as provided in the header of the corresponding memory region will be stored in the additional storage 94 in association with the chosen bounded pointer register 60. There are various ways in which the large token can be stored in the additional storage 94. Any suitable mechanism can be used provided that at the time a revocable bounded pointer within one of the bounded pointer registers 60 is to be used to generate a memory address, the appropriate second token for that bounded pointer can be accessed from the additional storage 94.

In some implementations, if a notification mechanism is in place that causes the core to receive notifications in the event of a write performed to any of the headers that are associated with revocable bounded pointers currently in its bounded pointer registers, then there may be no need for the additional storage. In particular, in that event, if the core has not received any such notification, and has not written to the relevant header itself, it knows that the header has not been changed and accordingly the region has not been deallocated, and hence the use authentication check can be avoided. With regards to the encoding operation that is required if the revocable bounded pointer is moved to memory, then the second token value can be loaded directly from the header for this purpose.

A particular example of such a notification mechanism is the cache coherency scheme example discussed earlier. In particular, if the header is cached, it may be possible to optimise the authentication check, so that the current core (i.e. the core using the revocable bounded pointer) does not actually need to perform the authentication check until the cache coherency scheme advises of an update to the cached version of the header, or the current core updates the header. In such case it may be possible to avoid the need for the additional storage 94. If in due course a notification about modification of the header is received, and no additional storage is provided, all revocable bounded pointers associated with the modified header, and currently residing in one of the bounded pointer registers, should be invalidated.

Figure 6:
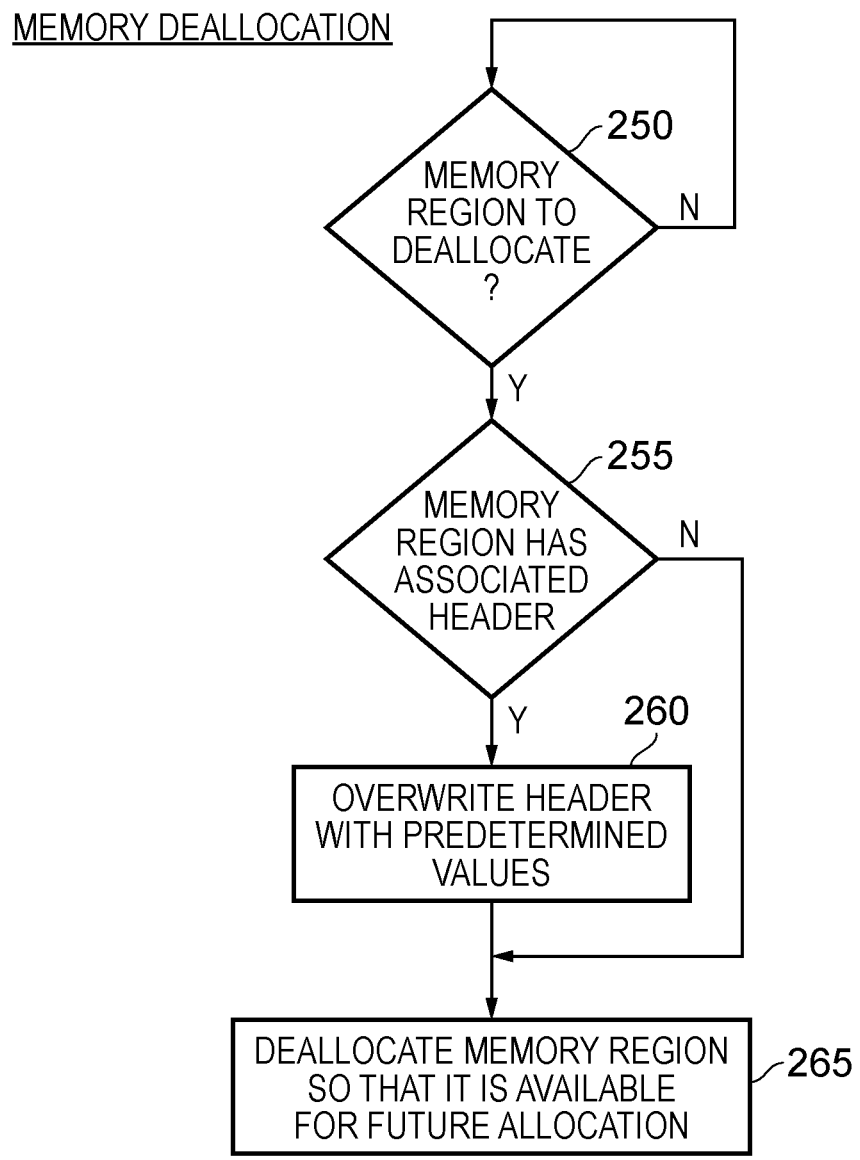
FIG. 6 is a flow diagram illustrating a memory deallocation process in accordance with one example.

FIG. 6 illustrates a memory deallocation operation that can be performed by the memory allocator/deallocator circuitry 92. When at step 250 it is determined that an allocated memory region needs to be deallocated, for example because the process that is intended to use that memory region has completed and accordingly there is no further need for the memory region, then the process proceeds to step 255 where it is determined whether the memory region has an associated header. This will be the case in situations where revocable bounded pointers have been created for use in association with that memory region.

If the memory region does have an associated header, then at step 260 the header is overwritten with predetermined values. Exactly what data is written to the header will vary depending on implementation, but the aim of the overwriting process is to ensure that the header no longer maintains the small and large token values that were previously stored in the header, as a result of which they will no longer match the token information maintained in association with a revocable bounded pointer that is associated with that memory region.

Following step 260, or directly following step 255 if the memory region does not have an associated header, the process proceeds to step 265 where the memory region is deallocated so that it then becomes available as part of a pool of memory addresses that can be used for future allocation of memory regions.

FIGS. 7A to 7C illustrate the use of headers, and the form of revocable bounded pointers, used in one example implementation. As shown in FIG. 7A, during a memory allocation process, a memory region 305 within the memory address space 300 can be determined as a memory region to be allocated. The allocated memory region will have a base address identifying the first address within the region and a limit address identifying the last address within the region. Further, in situations where the memory region is to have revocable bounded pointers associated with it, then a header for the memory region will be generated which will be stored at a header location 310. The header location can take a variety of forms, but in one implementation it is required that its location can be determined using the range information for the allocated memory region that will be provided within a revocable bounded pointer for that memory region. In one example embodiment, the base address and limit address information will be encoded within the range information of the bounded pointer, and accordingly the header location is arranged so that it can be directly derivable from one of the base address or the limit address. In the example shown, the header location is directly determinable from the base address, and in particular is formed of memory address bits just before the start of the allocated memory region. However, it is not a requirement that the header location is directly adjacent to the memory region and instead it can be at a fixed offset before the start of the memory region, enabling the header location to be determined from the base address and the fixed offset. Alternatively, the header location can be arranged to be just after the end of the allocated memory region so that it can be determined using the limit address. Again, it could alternatively be at a fixed offset after the end of the memory region.

As a yet further example, the header can be placed in an arbitrary separate location relative to the memory region, provided that it is possible to determine its location from the address of the memory region using some determined mechanism. As an example, it may be possible to use a binary search tree, with the allocated memory region's address as a search key and the headers as corresponding values.

In some example implementations, the header location can be provided as software-addressable memory bits, but alternatively can be provided as non-software-addressable memory bits, in much the same way as ECC bits can be provided in association with data in memory.

The format of the header can take a variety of forms, but one format is shown by block 315 in FIG. 7B. In this example, four fields are provided, namely a small token field 320 to store a small token value, a large token field 335 to store a large token value, and additional fields to store certain bits of information that will be provided in a revocable bounded pointer associated with the memory region. In particular, a field 325 can be provided to store a certain portion of the range information. In one example implementation, the portion stored in this field is that portion which is not needed in order to identify the header location. Considering the example of FIG. 7A where the base address is used to identify the header location, the field 325 could hence store the limit address, and be referred to as the limit field. However, if it was the limit address that was used to identify the header location, then the base address could be identified in the field 325, with that field being referred to as the base field.

In one example implementation, the field 325 may be sufficient, but if desired further bits of information from the bounded pointer can also be reproduced within the header. For example, the permissions field 330 can be provided to store at least a portion of the permission bits of the bounded pointer. Typically, the permission field will be used to store those permission bits that will be common for any bounded pointers created for use in association with the allocated memory region.

FIG. 7C illustrates an example revocable bounded pointer 340, and in particular various fields that may be provided therein. As shown, the revocable bounded pointer includes a pointer field 345 for storing a pointer value, a base field 350 for identifying the base address of the memory region, a limit field 355 for identifying the limit address, a permissions field 360 for storing various permissions bits, a small token field 365 for storing a small token value, and the additional bit fields shown. In particular, an R bit field 370 can be used which is set to identify that the bounded pointer is a revocable bounded pointer, and is cleared when the bounded pointer is a standard bounded pointer. Further, the T bit information discussed earlier with reference to FIG. 3 can be stored within the T bit field 380. Optionally, an E bit field 375 can be provided which can be used to identify whether the content of the bounded pointer is encoded or not.

In some implementations the use of the E bit will not be necessary. For example, in one implementation it may be the case that a revocable bounded pointer is always decoded when it is stored within one of the bounded pointer registers 60, and is always encoded when it is stored in the memory 50. In that instance, the E bit information can be inferred, and there is no need for a separate field to be provided. However, in implementations where it is desirable to allow encoded bounded pointers to reside within one of the bounded pointer registers 60, then the E bit field 375 can be provided, so that it can be ascertained whether a particular revocable bounded pointer is currently in an encoded form (where it cannot be used when generating a memory access) or a decoded form (where it can be used when performing a memory access, provided a use authentication check process is passed).

In one example implementation, at the time a bounded pointer is generated, it is created within one of the bounded pointer registers 60, for example the bounded pointer register 385 shown in FIG. 7C. At the time the bounded pointer is stored within the bounded pointer register, then an associated portion of the additional storage 94, such as the portion 390, will be used to store the relevant large token, i.e. the large token stored in the large token field 335 of the header 315 for the corresponding memory region.

For a bounded pointer to be used in generating a memory address, it must first reside in one of the bounded pointer registers 60, and accordingly at the time it is used, the additional storage will capture the large token information. As indicated in FIG. 7C, the additional storage can if desired be arranged to be software inaccessible by at least some types of software, hence improving the security of the large token information by preventing the potential for software modification of the large token value.

At the point a revocable bounded pointer is to be used to generate a memory address, then a use authentication check process can be implemented under hardware control as illustrated in FIG. 8.

In particular, when an instruction is being executed within the execution pipeline that is causing a memory address to be generated, then the processor hardware can determine at step 400 that a revocable bounded pointer is to be used to generate a memory address, at which point the process can proceed to step 405. At step 405, at least part of the range information provided within the revocable bounded pointer is used to identify the header for the memory region. Consider in the example of FIG. 7A, the base address information stored within the base field 350 will be used for this purpose but, as discussed earlier, in an alternative implementation it may be the limit address information that is used for this purpose.

Once the header location has been identified, then the token values held in the small and large token fields of the header are retrieved at step 410. It should be noted that it may not be necessary to access main memory in order to obtain the small and large token fields of the header. For example, in many systems there will be one or more levels of cache which may be used to cache data for access by the processing pipeline 4, such as the level one and level two caches 36, 44, discussed earlier. Accordingly, it is possible for the contents of the header to be cached, so as to improve access times when the use authentication needs to be performed.

Thereafter, at step 415, it is determined whether the small token value in the revocable bounded pointer and the large token value in the associated additional storage match the retrieved values from the header. If not, then the process proceeds to step 425 where the revocable bounded pointer is revoked, which causes the request to generate the memory address to fail, and prevents any further use of the revocable bounded pointer.

However, assuming the check 415 is passed, then at step 420 a revocable bounded pointer is allowed to be used to generate the memory address. It should be noted that once the memory address has been generated, then all of the usual bounds and permission checks are performed in order to ensure that the memory address generated does fall within the range of the associated memory region, and that the type of access being requested is allowed to be performed having regards to the permissions information.

As mentioned earlier, in implementations where the large token is used, then an encoding and associated decoding mechanism can be used when transferring revocable bounded pointers between the bounded pointer storage elements 60 and memory. In particular, on storing a revocable bounded pointer to memory, a portion of the bounded pointer can be encoded using the large token, in a way that allows that portion of the revocable bounded pointer to be recreated at a later point during a decoding operation, using the second token value and the encoded bounded pointer. An example of the encoding operation that may be performed is illustrated by the flow diagram of FIG. 9. At step 450, it is determined whether there is a revocable bounded pointer to be stored to memory, and when that situation arises, the process proceeds to step 455, where the bounded pointer control circuitry 90 performs an encoding operation whilst moving the bounded pointer from the relevant bounded pointer register 60 to memory. In particular, at step 455 the identified portion of the bounded pointer is encoded using the large token stored in the additional storage 94 associated with the bounded pointer register storing the revocable bounded pointer. Considering the example of FIG. 7B, where the limit field and a subset of the permission bits are held within the header, then those are the bits that form the portion of the bounded pointer that is encoded using the large token. In particular, since the header contains a copy of that information, it can later be determined when performing an associated decoding operation whether the contents of the large token field 335 have changed, and hence whether the revocable bounded pointer should be revoked at the time the decoding is performed. This will be discussed in more detail later with reference to the flow diagram of FIG. 10.

Once the encoding operation has been performed at step 455, the encoded revocable bounded pointer is stored to memory at step 460, and if the bounded pointer format includes an E bit, then the E bit is set. Then, at step 465 the content of the relevant bounded pointer register and the associated additional storage may be invalidated if desired. At this point, the revocable bounded pointer has been migrated to memory, but in an encoded form that takes into account the large token value. As an alternative to invalidating the contents of the relevant bounded pointer register and the associated additional storage at step 465, that information can merely be retained if desired, in which event it will be appreciated that the revocable bounded pointer has been copied to memory in its encoded form whilst still leaving the revocable bounded pointer in the bounded pointer register.

In one embodiment, the encoding operation is performed whenever a revocable bounded pointer is to be stored from one of the bounded pointer registers into memory. When such an encoded bounded pointer is subsequently retrieved from memory for storage back into one of the bounded pointer registers 60, then it may be decoded prior to being written into the bounded pointer register. In particular, this approach will always be taken in situations where the bounded pointer format does not include information to identify whether the bounded pointer is encoded or not, and instead it will be predetermined that revocable bounded pointers will always be stored in encoded form in memory, and in non-encoded form within the registers. However, for bounded pointer formats that include the E bit, then it is possible for an encoded bounded pointer to be retrieved from memory into the bounded pointer register, albeit with that encoded form of bounded pointer not being able to be used to generate a memory address until it has been decoded. This can prove useful in certain situations, for example when migrating a bounded pointer between different regions of memory, during which process the bounded pointer may be loaded into one of the bounded pointer registers, and then stored back out to a different memory address.

FIG. 10 is a flow diagram illustrating the decoding operation in one example implementation. When it is determined that the bounded pointer is to be decoded at step 500, then the process proceeds to step 505 where at least the non-encoded part of the range information is used to identify the header for the associated memory region. Considering the example discussed earlier with reference to FIGS. 7A to 7C, since the limit field information is the part of the range information that is encoded, the base address information will be the information used to identify the header. However, if conversely it was the limit information that was used to identify the header, it would be the base information that would have been encoded, and that limit address would be used at step 505 to identify the header.

At step 510, the header contents are retrieved, whereafter at step 515 the encoded portion of the revocable bounded pointer is decoded using the value in the large token field 335 of the header 315. Assuming the value held in the large token field 335 is still the same as the large token value at the time the revocable bounded pointer was encoded, then this will recreate the relevant portion of the revocable bounded pointer in its decoded form. At step 520 it is determined whether the decoded portion matches the bounded pointer bit value stored in the header. Considering the example of FIG. 7B, this will involve comparing the decoded limit address information and various permission bit values with the corresponding data held in the fields 325, 330 of the header 315.

If for any reason a mismatch is detected at step 520, then the revocable bounded pointer is invalidated at step 530. Otherwise, it is determined at step 525 whether the small token value in the revocable bounded pointer matches the value in the small token field 320 of the header 315. If not, then again this causes invalidation of the revocable bounded pointer at step 530, but otherwise the process proceeds to step 535 where the decoded revocable bounded pointer is stored in the chosen bounded pointer register and the large token value retrieved from the header is stored into the appropriate location in the associated storage 94. Further, in embodiments where the E bit is used, then the E bit within the revocable bounded pointer will be cleared at this point, to confirm that the revocable bounded pointer is in a decoded form.

FIG. 11 schematically illustrates the encoding and decoding process described earlier. As shown at the top of FIG. 11, an unencoded bounded pointer 600 includes all of the various fields discussed earlier with reference to FIG. 7C, including limit and permission fields 610, 615 which in this example form the portion of the bounded pointer that will be encoded when storing the bounded pointer to memory. As mentioned earlier, not all permission bits may be included for this purpose. The additional storage 605 stores the corresponding large token value, and that large token value is used to perform the encoding operation 620, resulting in the encoded revocable bounded pointer 622 being stored to memory. This includes the various portions of the original unencoded bounded pointer other than the limit and permission fields 610, 615, and instead of the limit and permission fields 610, 615 there is an encoded portion 625 present within the encoded revocable bounded pointer.

When it is subsequently decided to decode the encoded revocable bounded pointer 622, then the base field 630 is accessed and used to identify the header 635 stored in memory in association with the corresponding memory region. The large token from the header is then retrieved and used to perform a decode operation 640 using the encoded portion 625 in order to produce decoded limit and permission information.

That decoded limit and permission information, along with the small token value, is input to a matching process 645, which also receives the limit, permissions and small token information from the header 635. In the event of a match being detected, then the decoded revocable bounded pointer is stored within the relevant bounded pointer register, and the large token value from the header 635 is stored into the additional storage 605. As shown in the bottom of FIG. 11, the original unencoded bounded pointer has therefore been recreated. If at step 645 a match is not detected then the revocable bounded pointer is invalidated/revoked.

As is apparent from FIG. 11, in implementations where the E bit is used, the E bit is cleared when the revocable bounded pointer is in an unencoded form, but is set when the bounded pointer is in an encoded form.

The encoding and associated decoding operations can take a variety of forms. The main requirement is that the encoded value produced by the encoding operation can be decoded to the same concatenated field values of the original revocable bounded pointer in situations where the same token value is used as was used at the time of encoding. It may in some instances also be desirable that the encoded value cannot be decoded to the same concatenated field values using any other token value. However, in some implementations it may be considered that this latter restriction is not required to facilitate a sufficient degree of resilience to use-after-free scenarios.

FIGS. 12A and 12B schematically illustrate two example encoding schemes that could be used, in situations where the number of bits in the large token is not directly identical to the number of bits in the relevant portion of the bounded pointer that is being encoded. In particular, one suitable encoding scheme would be to use an XOR binary operation applied between the relevant bits of the bounded pointer and the relevant bits of the large token. In situations where there are the same number of bits within the large token and within the relevant portion of the bounded pointer, then this is straight forward. If instead, as shown in FIG. 12A, the number of bits 700 within the bounded pointer that need to be encoded exceed the number of bits in the large token 705, then in one implementation the large token can be extended to add additional bits 710 using any suitable scheme, such as rotation. Thereafter, an XOR operation 715 can be applied between each corresponding pair of bits in the bounded pointer portion 700 and the extended large token formed by the portions 705, 710, in order to produce the encoded bits 720.

FIG. 12B illustrates an alternative approach where the large token is larger than the relevant number of bits of the bounded pointer that need to be encoded. In this instance, an XOR operation 740 is applied using the relevant bounded pointer bits 700 and the corresponding number of bits 730 of the large token, in order to generate the intermediate encoding 745. The remaining bits of the large token 735 can then be used to perform a supplemental operation on the intermediate encoding, in the example shown this being a rotation 750, in order to produce the encoded bits 755.

With both the approaches of FIGS. 12A and 12B, it will be appreciated that a corresponding decoding operation can be performed which, assuming the same large token is used, will cause the original bounded pointer bits 700 to be recreated.

However, it should be noted that FIGS. 12A and 12B are provided merely to illustrate specific examples of a suitable encoding scheme, and it will be appreciated that any other suitable encoding scheme can be used, providing it enables recreation of the bounded pointer bits using the same token value as was used during the encoding process.

There are many situations where it is highly beneficial to be able to reliably revoke a bounded pointer, to ensure that it is not used after the corresponded memory region has been deallocated. One example use case is shown in FIG. 13 where a first apparatus 800 has an associated memory 815, and is able to allocate a memory region 820 that it wants to temporarily allow access to from a second apparatus 805. In accordance with the scheme described herein, the first apparatus 800 may generate a revocable bounded pointer 810 for use in association with the memory region 820, and as a result of the mechanisms described herein a header 825 will also be created in association with the memory region 820.

The revocable bounded pointer 810 could then be passed to the second apparatus 805 to enable the second apparatus 805 to have access to the memory region 820. The second apparatus will then in hardware perform the use authentication check 830 when using the revocable bounded pointer to generate memory addresses.

As a result, when in due course the first apparatus 800 decides to deallocate the memory region 820, the mechanisms described earlier will ensure that if subsequently the second apparatus 805 seeks to use the revocable bounded pointer 810, the use authentication check 830 will fail, causing the revocable bounded pointer to be revoked, hence preventing its further use by the second apparatus 805.

In the examples discussed with reference to the figures, it is assumed that the portion of the revocable bounded pointer that is encoded when storing the revocable bounded pointer to memory is predetermined. In particular, with reference to FIG. 7B, in that example it is assumed that it is the limit address information and predetermined permission bits that form the portion of the bounded pointer that is encoded. However, in an alternative implementation, the actual bits used can be made configurable. For example, the header may comprise a control field identifying which bits of the revocable bounded pointer have been used to form the copied portion of the revocable bounded pointer stored in the header. For example, a mask field may be used to identify exactly which bits of the revocable bounded pointer are represented by the values in the fields 325, 330 of the header 315, and these need not be predetermined to be the limit address and certain permission bits. Due to the presence of a mask field, it can be determined at the time of encoding which bits of the revocable bounded pointer to use as an input to the encoding operation, and similarly at the time of decoding it can be determined which bits to subject to the decoding operation, in order to ensure that the original bits are recreated when the token value used during the decoding operation is the same as the token value that was used in the earlier encoding operation.

The techniques described herein provide a mechanism for significantly alleviating the prospect of a use-after-free scenario arising. The probability of preventing the use-after-free scenario depends on the size of the token used. Hence, there is a trade-off between the token sizes and the probability of preventing any use-after-free scenario arising. Thus, the token size can be chosen as appropriate depending on implementation. In some implementations, it may be sufficient merely to use the small token, and in such instances there would be no need for the encoding and decoding operation as described, since the small token can be accommodated entirely within the revocable bounded pointer. However, often it will be considered appropriate to use both the big token and the small token to produce an overall token of a suitable size. Purely by way of example, if the size of the concatenated big token and small token field is 40 bits, the probability of generating a token with a particular chosen value is about 1 in million of millions.

If desired, additional steps can be taken to reduce the prospects of an attacker circumventing the measures described herein. For example, it would be possible for an attacker to recreate a large number of random values, and to keep retrying a memory access with different token values specified. However, if desired, the processing apparatus can be arranged to prevent such activities, for example by stopping the attacking component from performing further attempts after the first access failure.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative examples of the invention have been described in detail herein with reference to the accompanying drawings, it is to be understood that the invention is not limited to those precise examples, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   memory allocation circuitry to allocate a memory region in memory; and
   bounded pointer generation circuitry to generate bounded pointers comprising at least a revocable bounded pointer for use in accessing the memory region, the revocable bounded pointer providing a pointer value and range information identifying an address range of the memory region;
   wherein the memory allocation circuitry is arranged to provide, at a header location in the memory, a header for the memory region, the header having a first token field whose stored value is initialised to a first token value associated with the memory region, the header location being derivable from the range information provided by the revocable bounded pointer, and wherein the memory allocation circuitry is responsive to a subsequent deallocation of the memory region to modify the stored value in the first token field of the header; and
   whereby in response to a request to generate a memory address using the revocable bounded pointer, a use authentication check is arranged to prevent generation of the memory address when it is determined that the stored value in the first token field has been changed, wherein:
   the use authentication check is arranged to invalidate the revocable bounded pointer when it is determined that the stored value in the first token field has been changed;
   the revocable bounded pointer is arranged to store the first token value; and
   in response to the request to generate a memory address using the revocable bounded pointer, the use authentication check is arranged to employ the range information to determine the header location, and to invalidate the revocable bounded pointer in the absence of a match between the first token value stored in the revocable bounded pointer and the stored value in the first token field of the header.

2. The apparatus as claimed in claim 1, further comprising token generation circuitry to generate the first token value.

3. The apparatus as claimed in claim 2, wherein the token generation circuitry is a pseudo random number generator.

4. The apparatus as claimed in claim 1, wherein the bounded pointer generation circuitry is further arranged to provide a revocable field in each generated bounded pointer, which is set when the generated bounded pointer is the revocable bounded pointer.

5. The apparatus as claimed in claim 1, further comprising:
   a set of bounded pointer registers, each bounded pointer register being arranged to store a bounded pointer for use in generating memory addresses.

6. The apparatus as claimed in claim 1, further comprising:
   a set of bounded pointer registers, each bounded pointer register being arranged to store a bounded pointer for use in generating memory addresses;
   wherein:
   the header further comprises a second token field arranged to store a second token value associated with the memory region, the second token value being absent from the revocable bounded pointer generated by the bounded pointer generation circuitry; and
   the use authentication check is further arranged to invalidate the revocable bounded pointer when it is determined that the second token value has been changed.

7. The apparatus as claimed in claim 6, further comprising:
   additional storage provided in association with the set of bounded pointer registers, wherein when the revocable bounded pointer is stored in a selected bounded pointer register, the additional storage is arranged to identify, in association with the selected bounded pointer register, the second token value as initialised in the second token field of the header;
   wherein the use authentication check is further responsive to the request to generate a memory address using the revocable bounded pointer as stored in the selected bounded pointer register, to invalidate the revocable bounded pointer in the absence of a match between the second token value stored in the header and the second token value stored in the additional storage in association with the selected bounded pointer register.

8. The apparatus as claimed in claim 7, wherein the additional storage is inaccessible to one or more types of software executing on the apparatus.

9. The apparatus as claimed in claim 6, further comprising a notification mechanism to identify when a write operation has been made to at least one of the first token field and the second token field of the header, thereby enabling the use authentication check to invalidate the revocable bounded pointer in the event that either the first token value or the second token value has been changed.

10. The apparatus as claimed in claim 6, wherein the memory allocation circuitry is responsive to the subsequent deallocation of the memory region to modify the value stored in the second token field of the header.

11. The apparatus as claimed in claim 6, further comprising token generation circuitry to generate the first token value, wherein the token generation circuitry is further arranged to generate the second token value.

12. The apparatus as claimed in claim 6, wherein:
   the header is arranged to store a copy of a portion of the revocable bounded pointer; and
   the apparatus comprises coding control circuitry arranged, when the revocable bounded pointer is to be stored to the memory from the selected bounded pointer register, to perform an encoding operation to create an encoded revocable bounded pointer by encoding the portion of the revocable bounded pointer using the second token value in a manner that allows the portion of the revocable bounded pointer to be recreated using the second token value and the encoded revocable bounded pointer, whereafter the encoded revocable bounded pointer is stored to the memory.

13. The apparatus as claimed in claim 12, wherein the portion of the revocable bounded pointer is a portion that is common to any bounded pointer generated for a currently allocated instance of the memory region.

14. The apparatus as claimed in claim 13, wherein the portion comprises at least a portion of the range information unrequired to identify the header location.

15. The apparatus as claimed in claim 14, wherein the range information comprises a base address and a limit address for the memory region, the header location is determined using one of the base address and the limit address, and the portion of the revocable bounded pointer for which a copy is stored in the header identifies the other of the base address and the limit address.

16. The apparatus as claimed in claim 12, wherein the portion of the revocable bounded pointer for which a copy is stored in the header comprises at least one or more permissions specified within the revocable bounded pointer.

17. The apparatus as claimed in claim 12, wherein the coding control circuitry is arranged to decode the encoded revocable bounded pointer by performing a decoding operation to decode the encoded portion of the revocable bounded pointer using the value stored in the second token field of the header to produce a recreated portion of the revocable bounded pointer, and to then perform a check operation to determine whether the recreated portion of the revocable bounded pointer matches the copied portion of the revocable bounded pointer stored in the header.

18. The apparatus as claimed in claim 17, wherein the coding control circuitry is arranged to invalidate the revocable bounded pointer when either:
the check operation indicates that the recreated portion of the revocable bounded pointer differs from the copied portion of the revocable bounded pointer stored in the header; or
the first token value in the decoded revocable bounded pointer differs from the stored value in the first token field of the header.

19. The apparatus as claimed in claim 17, wherein the coding control circuitry is arranged to perform the decoding operation whenever an encoded revocable bounded pointer is to be loaded from the memory into one of the bounded pointer registers.

20. The apparatus as claimed in claim 17, wherein:
each bounded pointer includes an encoding field which is set to indicate when a revocable bounded pointer has been encoded; and
an encoded revocable bounded pointer is required to be decoded by the coding control circuitry prior to that revocable bounded pointer being used to generate a memory address.

21. The apparatus as claimed in claim 12, wherein the header comprises a control field identifying which bits of the revocable bounded pointer have been used to form the copied portion of the revocable bounded pointer stored in the header.

22. The apparatus as claimed in claim 1, wherein the header location is arranged relative to the memory region so as to be one of:
a sequence of memory addresses immediately preceding the allocated memory region or at a fixed offset before the allocated memory region;
a sequence of memory addresses immediately following the allocated memory region or at a fixed offset after the allocated memory region;
a sequence of memory addresses at a location determined by performance of a computation based on an address of the memory region.

23. The apparatus as claimed in claim 1, wherein the header location is within a portion of memory non-addressable by one or more types of software executing on the apparatus.

24. The apparatus as claimed in claim 1, further comprising a cache structure arranged to maintain a copy of the stored value in the first token field of the header, wherein the use authentication check is arranged to reference the copy maintained in the cache structure when determining whether the stored value in the first token field has been changed.

25. The apparatus as claimed in claim 1, wherein the apparatus is arranged to provide the revocable bounded pointer to a further apparatus to control access to the memory region by the further apparatus, and the further apparatus is arranged to perform the use authentication check, whereby after the apparatus has deallocated the memory region, the further apparatus will be prevented from further use of the revocable bounded pointer to generate a memory address.

26. A method of controlling use of bounded pointers in an apparatus having memory allocation circuitry to allocate a memory region in memory, and bounded pointer generation circuitry to generate bounded pointers, the method comprising:
arranging the bounded pointer generation circuitry to generate at least a revocable bounded pointer for use in accessing the memory region, the revocable bounded pointer providing a pointer value and range information identifying an address range of the memory region;
providing, at a header location in the memory, a header for the memory region, the header having a first token field whose stored value is initialised to a first token value associated with the memory region, the header location being derivable from the range information provided by the revocable bounded pointer;
causing the memory allocation circuitry to be responsive to a subsequent deallocation of the memory region to modify the stored value in the first token field of the header; and
in response to a request to generate a memory address using the revocable bounded pointer, causing a use authentication check to prevent generation of the memory address when it is determined that the stored value in the first token field has been changed, wherein:
the use authentication check invalidates the revocable bounded pointer when it is determined that the stored value in the first token field has been changed;
the revocable bounded pointer stores the first token value; and
in response to the request to generate a memory address using the revocable bounded pointer, the use authentication check employs the range information to determine the header location, and to invalidate the revocable bounded pointer in the absence of a match between the first token value stored in the revocable bounded pointer and the stored value in the first token field of the header.

* * * * *